US011019684B2

(12) United States Patent
Goto et al.

(10) Patent No.: US 11,019,684 B2
(45) Date of Patent: May 25, 2021

(54) BASE STATION, TERMINAL APPARATUS, AND COMMUNICATION METHOD WITH SEMI-STATIC FIRST CONTROL INFORMATION AND DYNAMIC ALLOCATION SECOND CONTROL INFORMATION

(71) Applicants: SHARP KABUSHIKI KAISHA, Sakai (JP); FG Innovation Company Limited, Tuen Mun (HK)

(72) Inventors: Jungo Goto, Sakai (JP); Osamu Nakamura, Sakai (JP); Takashi Yoshimoto, Sakai (JP); Yasuhiro Hamaguchi, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/473,386

(22) PCT Filed: Dec. 19, 2017

(86) PCT No.: PCT/JP2017/045479
§ 371 (c)(1),
(2) Date: Jun. 25, 2019

(87) PCT Pub. No.: WO2018/123720
PCT Pub. Date: Jul. 5, 2018

(65) Prior Publication Data
US 2020/0146108 A1 May 7, 2020

(30) Foreign Application Priority Data

Dec. 27, 2016 (JP) .............................. JP2016-252806

(51) Int. Cl.
*H04W 88/10* (2009.01)
*H04W 76/11* (2018.01)
(Continued)

(52) U.S. Cl.
CPC ....... *H04W 88/10* (2013.01); *H04W 72/0446* (2013.01); *H04W 72/0453* (2013.01);
(Continued)

(58) Field of Classification Search
None
See application file for complete search history.

(56) References Cited

U.S. PATENT DOCUMENTS

2017/0367116 A1* 12/2017 Li ..................... H04W 52/0216
2018/0242310 A1* 8/2018 Au ................... H04W 74/0866
2019/0036756 A1* 1/2019 Yl .......................... H04L 67/12

OTHER PUBLICATIONS

3GPP, TR36.888 V12.0.0, "Study on provision of low-cost Machine-Type Communications (MTC) User Equipments (UEs) based on LTE", Jun. 2013.

(Continued)

*Primary Examiner* — Christine T Duong
(74) *Attorney, Agent, or Firm* — ScienBiziP, P.C.

(57) ABSTRACT

A base station apparatus for communicating with a terminal apparatus includes: a controller configured to generate first control information specific to the terminal apparatus and second control information addressed to multiple terminal apparatuses, and a receiver configured to receive an uplink physical channel, wherein the receiver receives data which the terminal apparatus transmits without receiving, in the first control information, control information for uplink grant, the first control information indicates semi-static allocation of a radio resource used for transmission of the data, and the second control information indicates dynamic allocation of the radio resource used for transmission of the data.

10 Claims, 12 Drawing Sheets

(51) Int. Cl.
*H04W 76/27* (2018.01)
*H04W 72/04* (2009.01)
*H04W 72/12* (2009.01)
*H04W 72/14* (2009.01)
*H04W 88/06* (2009.01)

(52) U.S. Cl.
CPC ... *H04W 72/0493* (2013.01); *H04W 72/1284* (2013.01); *H04W 72/14* (2013.01); *H04W 76/11* (2018.02); *H04W 76/27* (2018.02); *H04W 88/06* (2013.01)

(56) References Cited

OTHER PUBLICATIONS

3GPP, TR45.820 V13.0.0, "Cellular system support for ultra-low complexity and low throughput Internet of Things (CIoT)", Aug. 2015.
ZTE et al., R1-165595, 3GPP TSG RAN WG1 #85 Meeting, Nanjing, China, May 23-27, 2016.
Huawei Hisilicon, "Considerations on grant free transmission for NR", 3GPP TSG-RAN WG2 Meeting #96, R2-168478, Reno, Nevada, USA, Nov. 14-18, 2016.

\* cited by examiner

BASE STATION, TERMINAL APPARATUS, AND COMMUNICATION METHOD WITH SEMI-STATIC FIRST CONTROL INFORMATION AND DYNAMIC ALLOCATION SECOND CONTROL INFORMATION

TECHNICAL FIELD

The present invention relates to a base station apparatus, a terminal apparatus, and a communication method for these apparatuses.

This application claims priority based on JP 2016-252806 filed on Dec. 27, 2016, the contents of which are incorporated herein by reference.

BACKGROUND ART

In recent years, 5th Generation (5G) mobile telecommunication systems have been focused on, and standardization of specifications for a communication technology is expected, the technology establishing MTC mainly based on a large number of terminal apparatuses (Massive Machine Type Communications; mMTC), Ultra-reliable and low latency communications (URLLC), and enhanced Mobile BroadBand (eMBB). The 3rd Generation Partnership Project (3GPP) has been studying New Radio (NR) as a 5G communication technique and discussing Multiple Access (MA) for NR.

In 5G, Internet of Things (IoT), which allows connection of various types of equipment not previously connected to a network, is expected to be realized, and realization of mMTC is an important issue. In 3GPP, a Machine-to-Machine (M2M) communication technology has already been standardized as Machine Type Communication (MTC) that accommodates terminal apparatuses transmitting and/or receiving small size data (NPL 1). Furthermore, in order to support data transmission at a low rate in a narrow band, effort has been made to specify Narrow Band-IoT (NB-IoT) (NPL 2). 5G is expected to accommodate more terminals than the above-described standards and to accommodate IoT equipment requiring ultra-reliable and low-latency communications.

On the other hand, in communication systems such as Long Term Evolution (LTE) and LTE-Advanced (LTE-A) which are specified by the 3GPP, terminal apparatuses (User Equipment (UE)) use a Random Access Procedure, a Scheduling Request (SR), and the like, to request a radio resource for transmitting uplink data to a base station apparatus (also referred to as a Base Station (BS) or an evolved Node B (eNB)). The base station apparatus provides uplink grant (UL Grant) to each terminal apparatus based on an SR. In a case that the terminal apparatus receives UL Grant for control information from the base station apparatus, the terminal apparatus transmits uplink data using a given radio resource (referred to as Scheduled access or grant-based access and hereinafter referred to as scheduled access), based on an uplink transmission parameter included in the UL Grant. In this manner, the base station apparatus controls all uplink data transmissions (the base station apparatus knows radio resources for uplink data transmitted by each terminal apparatus). In the scheduled access, the base station apparatus can establish Orthogonal Multiple Access (OMA) by controlling uplink radio resources.

5G mMTC includes a problem in that the use of the scheduled access increases the amount of control information. URLLC includes a problem in that the use of the scheduled access increases delay. Thus, grant free access (also referred to as grant less access, Contention-based access, Autonomous access, or the like; hereinafter referred to as grant free access) has been studied in which the terminal apparatus transmits data without performing any random access procedure, SR transmission, UL Grant reception, or the like (NPL 3). In the grant free access, increased overhead associated with control information can be suppressed even in a case that a large number of devices transmit small size data. Furthermore, in the grant free access, no UL Grant reception or the like is performed, and thus the time from generation until transmission of transmission data can be shortened.

CITATION LIST

Non Patent Literature

NPL 1: 3GPP, TR36.888, V12.0.0, "Study on provision of low-cost Machine-Type Communications (MTC) User Equipments (UEs) based on LTE. June 2013

NPL 2: 3GPP, TR45.820 V13.0.0, "Cellular system support for ultra-low complexity and low throughput Internet of Things (CIoT)," August 2015

NPL 3: R1-165595, 3GPP TSG RAN WG1#85 Meeting, Nanjing, China, May 23-27, 2016

SUMMARY OF INVENTION

Technical Problem

In a case that the base station apparatus allows a terminal apparatus performing data transmission corresponding to mMTC and URLLC to transmit data using grant free access, the base station apparatus fails to manage timings and frequency resources for data transmission by the terminal apparatus, and thus a collision of data occurs. In this case, re-transmission control may be used to satisfy prescribed communication quality. However, this control includes a problem in that a long time is needed before data (packets) is correctly detected, that is, delay is increased.

In view of such circumstances, an object of an aspect of the present invention is to provide a base station apparatus capable of efficiently accommodating a terminal apparatus performing data transmission based on mMTC and URLLC using grant free access, and also to provide a terminal apparatus and a communication method.

Solution to Problem

To address the above-mentioned drawbacks, a base station apparatus, a terminal apparatus, and a communication method according to an aspect of the present invention are configured as follows.

(1) An aspect of the present invention is a base station apparatus for communicating with a terminal apparatus, the base station apparatus including: a controller configured to generate first control information specific to the terminal apparatus and second control information addressed to multiple terminal apparatuses, and a receiver configured to receive an uplink physical channel, wherein the receiver receives data which the terminal apparatus transmits without receiving, in the first control information, control information for uplink grant, the first control information indicates semi-static allocation of a radio resource used for transmission of the data, and the second control information indicates dynamic allocation of the radio resource used for transmission of the data.

(2) According to an aspect of the present invention, an ID for detecting the first control information differs from an ID for detecting the second control information.

(3) According to an aspect of the present invention, the controller generates control information for indicating at least one of a physical channel used for transmission of the second control information or a candidate search space to which the second control information is to be mapped.

(4) According to an aspect of the present invention, information of the radio resource included in the second control information includes the relative number of subframes from the subframe in which the second control information has been transmitted to a starting subframe, and the number of effective subframes.

(5) According to an aspect of the present invention, the first control information includes either a subframe number or a period information for inhibiting the terminal apparatus from transmitting data without receiving the control information for the uplink grant.

(6) An aspect of the present invention is a terminal apparatus for communicating with a base station apparatus, the terminal apparatus including: a receiver configured to receive, from the base station apparatus, first control information specific to the terminal apparatus and second control information addressed to multiple terminal apparatuses; and a transmitter configured to perform uplink data transmission, based on the first control information or the second control information, wherein the transmitter transmits data without receiving, in the first control information, control information for uplink grant, the first control information is information for semi-static allocation of a radio resource used for the data transmission, and the second control information is information for dynamic allocation of the radio resource used for the data transmission.

(7) According to an aspect of the present invention, the transmitter performs the uplink data transmission, based on the first control information in a case of having failed to detect the second control information.

(8) An aspect of the present invention, further includes a controller configured to generate control information for requesting the uplink grant, wherein in a case that the second control information fails to be detected, the control information for requesting the uplink grant is transmitted.

(9) According to an aspect of the present invention, in a case that the second control information having been detected includes information for indicating non-contiguous frequency resources, a frequency resource used for data transmission is selected without reception of the control information for the uplink grant.

(10) According to an aspect of the present invention, in a case that the receiver receives an ID for receiving the second control information, reception processing for the second control information is performed only in a case that data to be transmitted by the transmitter is present in a buffer.

(11) According to an aspect of the present invention, the first control information includes a subframe number and a period information for inhibiting the terminal apparatus from transmitting data without receiving the control information for the uplink grant.

Advantageous Effects of Invention

According to one or more aspects of the present invention, the terminal apparatus can be efficiently accommodated that performs data transmission for mMTC and URLLC using grant free access.

DESCRIPTION OF EMBODIMENTS

Figure 1:
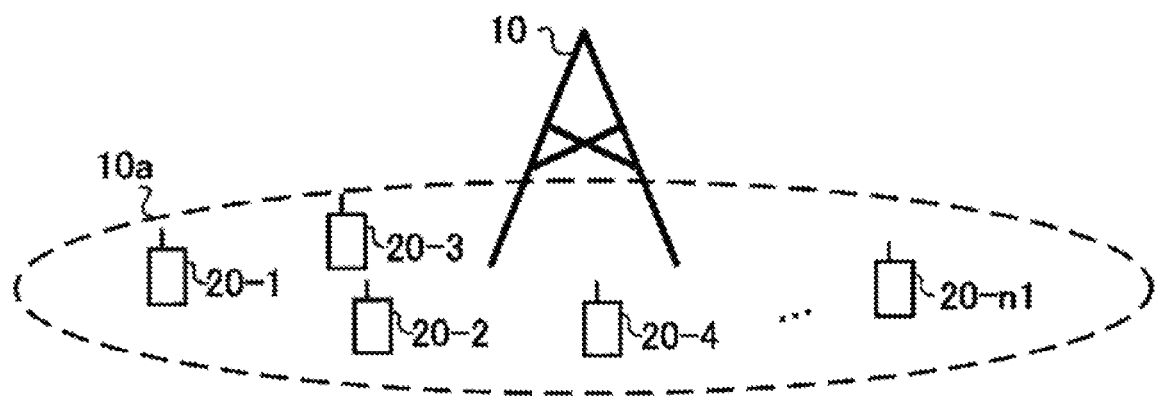
FIG. 1 is a diagram illustrating an example of a communication system according to a first embodiment.

A communication system according to the present embodiments includes a base station apparatus (also referred to as a cell, a small cell, a pico cell, a serving cell, a component carrier, an eNodeB (eNB), a Home eNodeB, a Low Power Node; a Remote Radio Head, a gNodeB (gNB), or a control station), and a terminal apparatus (also referred to as a terminal, a mobile terminal, a mobile station, or User Equipment (UE)). In the communication system, in case of a downlink, the base station apparatus serves as a transmitting apparatus (a transmission point, a transmit antenna group, or a transmit antenna port group), and the terminal apparatus serves as a receiving apparatus (a reception point, a reception terminal, a receive antenna group, or a receive antenna port group). In a case of an uplink, the base station apparatus serves as a receiving apparatus, and the terminal apparatus serves as a transmitting apparatus. The communication system is also applicable to Device-to-Device (D2D) communication. In this case, the terminal apparatus serves both as a transmitting apparatus and as a receiving apparatus.

The communication system is not limited to data communication with human intervention between the terminal apparatus and the base station apparatus, but is also applicable to a type of data communication requiring no human intervention, such as Machine Type Communication (MTC), Machine-to-Machine (M2M) Communication, communication for Internet of Things (IoT), or Narrow Band-IoT (NB-IoT) (hereinafter referred to as MTC). In this case, the terminal apparatus serves as an MTC terminal. The communication system can use, in the uplink and the downlink, a transmission scheme such as Discrete Fourier Transform Spread—Orthogonal Frequency Division Multiplexing (DFTS-OFDM, also referred to as SC-FDMA), OFDM, or Sparse Code Multiple Access (SCMA). The communication system can also use Filter Bank Multi Carrier (FBMC), Filtered-OFDM (f-OFDM) to which a filter is applied, Universal Filtered-OFDM (UF-OFDM), or Windowing-OFDM (W-OFDM), a transmission scheme using a sparse code (Sparse Code Multiple Access (SCMA)), or the like. Furthermore, the communication system may apply DFT precoding and use a signal waveform for which the filter described above is used. Furthermore, the communication system may apply code spreading, interleaving, the sparse code, and the like in the above-described transmission scheme. Note that, in the description below, at least one of the DFTS-OFDM transmission and the OFDM transmission is used in the uplink, whereas the OFDM transmission is used in the downlink but that the present embodiments are not limited to this configuration and any other transmission scheme is applicable.

The base station apparatus and the terminal apparatus according to the present embodiments can communicate in a frequency band for which a permission has been obtained from the government of a country or region where a radio operator provides service, i.e., a so-called licensed band, and/or in a frequency bands that requires no permission from the government of the country or region, i.e., a so-called unlicensed band. In the unlicensed band, communication may be based on carrier sense (e.g., a listen before talk scheme).

According to the presents, "X/Y" includes the meaning of "X or Y". According to the present embodiments, "X/Y" includes the meaning of "X and Y". According to the present embodiments, "X/Y" includes the meaning of "X and/or Y".

First Embodiment

FIG. 1 is a diagram illustrating an example of a configuration of a communication system according to the present embodiment. The communication system according to the present embodiment includes a base station apparatus 10 and terminal apparatuses 20-1 to 20-$n1$ ($n1$ is a number of terminal apparatuses connected to the base station apparatus 10). The terminal apparatuses 20-1 and 20-$n1$ are also collectively referred to as terminal apparatuses 20. Coverage 10a is a range (a communication area) in which the base station apparatus 10 can connect to the terminal apparatuses 20 (coverage 10a is also referred to as a cell).

In FIG. 1, the base station apparatus 10 and the terminal apparatuses 20 support, in the uplink, Multiple Access (MA) using grant free access (also referred to as grant less access, Contention-based access, or Autonomous access). In the grant free access, the terminal apparatuses 20 transmits uplink data (such as a physical uplink channel) regardless of reception of control information for uplink grant (UL Grant, also referred to as scheduling grant) (without receiving UL Grant) from the base station apparatus 10. The base station apparatus 10 and the terminal apparatuses 20 may support non-orthogonal multi-access. Note that the base station apparatus 10 and the terminal apparatuses 20 can support both the grant free access and scheduled access. The base station apparatus 10 and the terminal apparatuses 20 can support both non-orthogonal multi-access and orthogonal multi-access. Note that the UL Grant is control information for indication by the base station apparatus 10 to the terminal apparatus 20, by using a Downlink Control Information (DCI) used for scheduling a physical uplink shared channel (e.g., Physical Uplink Shared Channel (PUSCH), or New Radio PUSCH (NRPUSCH)), to indicate resource block assignment to a physical uplink shared channel (e.g. a resource block assignment field for the physical uplink shared channel included in a DCI format transmitted on a physical downlink control channel in LTE).

The downlink control information for physical channel transmission in the uplink may include a shared field shared between the scheduled access and the grant free access. In this case, in a case that the base station apparatus 10 indicates transmission of the uplink physical channel using the grant free access, the base station apparatus 10 and the terminal apparatus 20 interpret a bit sequence stored in the shared field in accordance with a configuration for the grant free access (e.g., a look-up table defined for the grant free access). Similarly, in a case that the base station apparatus 10 indicates transmission of the uplink physical channel using the scheduled access, the base station apparatus 10 and the terminal apparatus 20 interpret the shared field in accordance with a configuration for the scheduled access. Transmission of the uplink physical channel in the grant free access is referred to as Asynchronous data transmission. Note that the transmission of the uplink physical channel in the scheduled access is referred to as Synchronous data transmission.

In the grant free access, the terminal apparatus 20 may randomly select a radio resource for transmission of uplink data. For example, the terminal apparatus 20 has been notified, by the base station apparatus 10, of multiple candidates for available radio resources as a resource pool, and randomly selects a radio resource from the resource pool. In the grant free access, the radio resource in which the terminal apparatus 20 transmits the uplink data may be configured in advance by the base station apparatus 10. In this case, the terminal apparatus 20 transmits the uplink data using the radio resource configured in advance without receiving the UL Grant. The radio resource includes multiple uplink multi-access resources (resources to which the uplink data can be mapped). The terminal apparatus 20 transmits the uplink data by using one or more uplink multi-access resources selected from the multiple uplink multi-access resources. Note that the radio resource in which the terminal apparatus 20 transmits the uplink data may be predetermined in the communication system including the base station apparatus 10 and the terminal apparatus 20. The radio resource for transmission of the uplink data may be notified to the terminal apparatus 20 by the base station apparatus 10 using a physical broadcast channel (e.g., Physical Broadcast Channel (PBCH) or New Radio Physical Broadcast Channel (NRPBCH))/Radio Resource Control (RRC)/system information (e.g. System Information Block (SIB)/physical downlink control channel (downlink control information, e.g., Physical Downlink Control Channel (PDCCH), Enhanced PDCCH (EPDCCH), MTC PDCCH (MPDCCH), Narrowband PDCCH (NPDCCH), or New Radio PDCCH (NRPDCCH).

In the grant free access, the uplink multi-access resource includes a multi-access physical resource and a Multi-Access Signature Resource. The multi-access physical resource is a resource including time and frequency. The multi-access physical resource and the multi-access signature resource may be used to identify the uplink physical channel transmitted by each terminal apparatus. The resource blocks are units to which the base station apparatus 10 and the terminal apparatus 20 are capable of mapping the physical channel (e.g., the physical data shared channel or the physical control channel). Each of the resource blocks includes one or more subcarriers (e.g., 12 subcarriers or 16 subcarriers) in a frequency domain.

Figure 2:
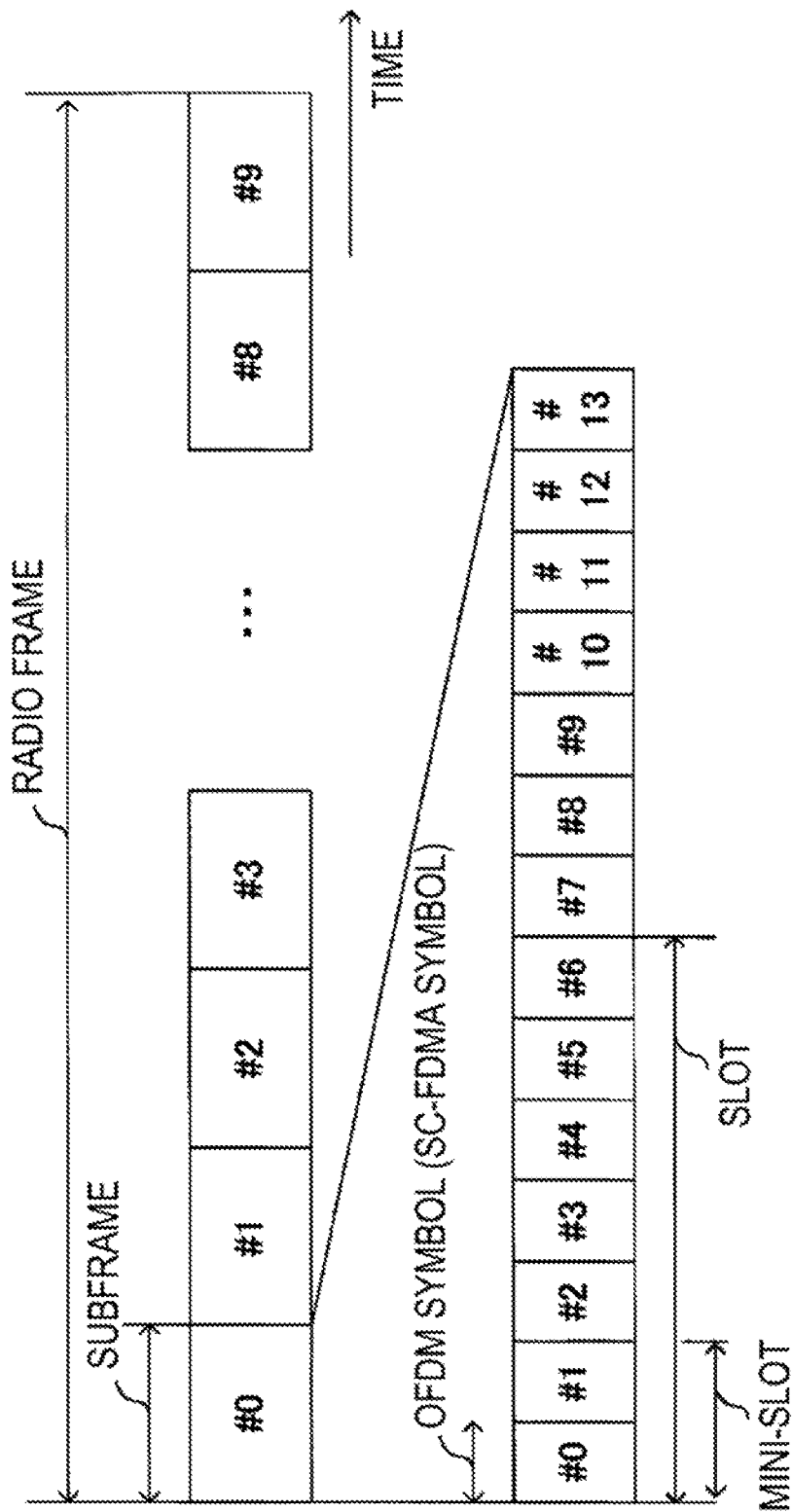
FIG. 2 is a diagram illustrating an example of a radio frame configuration for the communication system according to the first embodiment.

FIG. 2 is a diagram illustrating an example of a radio frame configuration for a communication system according to the present embodiment. The radio frame configuration indicates a configuration of multi-access physical resources in a time domain. One radio frame includes multiple subframes. FIG. 2 is an example in which one radio frame includes 10 subframes. The terminal apparatus 20 has a subcarrier spacing used as a reference (reference numerology). The subframe includes multiple OFDM symbols generated at the subcarrier spacings used as the reference. FIG. 2 is an example in which one subframe includes 14 OFDM symbols.

One slot includes multiple OFDM symbols generated at subcarrier spacings used for uplink data transmission by the terminal apparatus 20. FIG. 2 is an example in which one slot includes seven OFDM symbols. FIG. 2 illustrates a case where the subcarrier spacing used as the reference is the same as a subcarrier spacing used for the uplink data transmission. In this case, one subframe includes multiple slots. FIG. 2 is an example in which one subframe includes two slots. The communication system according to the present embodiment may use slots as minimum units to which the terminal apparatus 20 maps the physical channel (e.g., the physical data shared channel or the physical control channel). In this case, in the multi-access physical resource, one slot is defined as a resource block unit in the time domain.

One mini-slot includes multiple OFDM symbols (e.g., two or four OFDM symbols) generated at the subcarrier spacings used for the uplink data transmission by the terminal apparatus 20. A mini-slot length is shorter than a slot length. FIG. 2 is an example in which one mini-slot includes two OFDM symbols. The base station apparatus 10 may configure the number of OFDM symbols constituting the slot/mini slot. The base station apparatus 10 may signal the number of OFDM symbols constituting the slot/mini slot to notify the terminal apparatus 20 of the number. The communication system according to the present embodiment may use mini-slots as minimum units to which the terminal apparatus 20 maps the physical channel (e.g., the physical data shared channel or the physical control channel). In this case, in the multi-access physical resource, one mini-slot is a resource block unit in the time domain.

The multi-access signature resource includes at least one multi-access signature of multiple multi-access signature groups (also referred to as multi-access signature pools). The multi-access signature is information indicating a characteristic (mark or indicator) that distinguishes (identifies) the uplink physical channel transmitted by each terminal apparatus. Examples of the multi-access signature include a spatial multiplexing pattern, a spreading code pattern (a Walsh code, an Orthogonal Cover Code (OCC), a cyclic shift for data spreading, the sparse code, or the like), an interleaved pattern, a demodulation reference signal pattern (a reference signal sequence, the cyclic shift, the OCC, or IFDM)/an identification signal pattern, and transmit power, at least one of which is included in the multi-access signature. In the grant free access, the terminal apparatus 20 transmits the uplink data by using one or more multi-access signatures selected from the multi-access signature pool. The terminal apparatus 20 can notify the base station apparatus 10 of available multi-access signatures. The base station apparatus 10 can notify the terminal apparatus of a multi-access signature used by the terminal apparatus 20 to transmit the uplink data. The base station apparatus 10 can notify the terminal apparatus 20 of an available multi-access signature group by the terminal apparatus 20 to transmit the uplink data. The available multi-access signature group may be notified by using the broadcast channel/RRC/system information/downlink control channel. In this case, the terminal apparatus 20 can transmit the uplink data by using a multi-access signature selected from the notified multi-access signature group.

The terminal apparatus 20 transmits the uplink data by using a multi-access resource. For example, the terminal apparatus 20 can map the uplink data to a multi-access resource including a multi-carrier signature resource including one multi-access physical resource, a spreading code pattern, and the like. The terminal apparatus 20 can allocate the uplink data to a multi-access resource including a multi-carrier signature resource including one multi-access physical resource and an interleaved pattern. The terminal apparatus 20 can also map the uplink data to a multi-access resource including a multi-access signature resource including one multi-access physical resource and a demodulation reference signal pattern/identification signal pattern. The terminal apparatus 20 can also map the uplink data to a multi-access resource including one multi-access physical resource and a multi-access signature resource including a transmit power pattern (e.g., the transmit power for each of the uplink data may be configured to cause a difference in receive power at the base station apparatus 10) In such grant-free access, the communication system of the present embodiment may allow the uplink data transmitted by the multiple terminal apparatuses 20 to overlap (collide) with one another in the uplink multi-access physical resource.

The base station apparatus 10 detects, in the grant free access, a signal of the uplink data transmitted by each terminal apparatus. To detect the uplink data signal, the base station apparatus 10 may include Symbol Level Interference Cancellation (SLIC) in which interference is canceled based on a demodulation result for an interference signal, Codeword Level Interference Cancellation (CWIC, also referred to as Sequential Interference Canceler (SIC) or Parallel Interference Canceler (PIC)) in which interference is canceled based on the decoding result for the interference signal, turbo equalization, maximum likelihood detection (MLD, Reduced complexity maximum likelihood detection (R-MLD)) in which transmit signal candidates are searched for the most probable signal, Enhanced Minimum Mean Square Error-Interference Rejection Combining (EMMSE-IRC) in which interference signals are suppressed by linear computation, signal detection based on message passing (Belief propagation (BP), Matched Filter (MF)-BP in which a matched filter is combined with BP, or the like. Note that, in the following description, a case is described in which the base station apparatus 10 detects, in the grant free access, a non-orthogonally multiplexed uplink data signal by applying an Advanced Receiver with turbo equalization or the like but that the present embodiment is not limited to this configuration so long as an uplink data signal can be detected. For example, 1-Tap MMSE may be used that does not use a matched filter such as Maximal Ratio Combining (MRC) or an interference canceller.

In FIG. 1, uplink radio communication using the scheduled access/grant free access includes the following uplink physical channels. The uplink physical channels are used for transmitting information output from a higher layer.

Physical uplink control channel

Physical uplink shared channel

Physical random access channel

The physical uplink control channel (e.g., Physical Uplink Control Channel (PUCCH) or New Radio PUCCH (NR-PUCCH)) is a physical channel used for transmission of Uplink Control Information (UCI).

The uplink control information includes a positive ACKnowledgement (ACK) or a Negative ACKnowledgement (NACK) (ACK/NACK) for downlink data (a downlink transport block or a Downlink-Shared Channel (DL-SCH)). The ACK/NACK is also referred to as a signal indicating delivery confirmation, HARQ-ACK, or HARQ feedback. Note that supporting the scheduled access allows the uplink control information to include a Scheduling Request (SR).

The uplink control information includes Channel State Information (CSI) for the downlink. The channel state information includes a Rank Indicator (RI) indicating a preferable spatial multiplexing number (the number of layers), a Precoding Matrix Indicator (PMI) indicating a suitable precoder, a Channel Quality Indicator (CQI) specifying a preferable transmission rate, and the like. The PMI indicates a codebook determined by the terminal apparatus 20. The codebook is related to precoding of a physical downlink shared channel (Physical Downlink Shared Channel (PDSCH) or New Radio Physical Downlink Shared Channel (NRPDSCH)). The CQI can be a preferable modulation scheme (e.g., Binary Phase Shift Keying (BPSK), quadrature Phase Shift Keying (QPSK), 16 quadrature amplitude modulation (16QAM), 64QAM, or 256QAM) or a preferable coding rate for a prescribed band. Note that, for the grant free access, the uplink control information may be omitted.

The physical uplink shared channel is a physical channel used for transmission of uplink data (uplink transport blocks, UL-SCH). The physical uplink shared channel may be used for transmission of ACK/NACK and/or channel state information for downlink data. The physical uplink shared channel may be used for transmission of uplink control information. The physical uplink shared channel may be generated by adding Cyclic Redundancy Check (CRC) to uplink data. The CRC may be scrambled (the scrambling is also referred to as an exclusive-OR operation, masking, or ciphering) by using a sequence representing an identifier for the terminal apparatus 20 (also referred to as User Equipment Identifier (UE ID)). As a UE ID, a Cell-Radio Network Temporary Identifier (C-RNTI), a Temporary C-RNTI (T C-RNTI), or the like can be used. The UE ID may be allocated to the terminal apparatus 20 by the base station apparatus 10 in a case that the terminal apparatus 20 accesses a new cell by a cell update procedure. The base station apparatus 10 may notify each terminal apparatus of each UE ID. The UE ID may also be included in message 2 (Random Access Response (RAR)/message 4 (Contention Resolution) in a random access procedure. The UE ID can also be included in a Radio Resource Control (RRC) message.

In the grant free access, the UE ID is associated with parameters used to identify an uplink physical channel (e.g., parameters related to configurations of reference signal/spreading code/interleave pattern/transmit power control). In the grant free access, the UE ID is associated with parameters related to a multi-access signature resource. For the UE ID, an identifier for the grant free access may be defined that is distinct from an identifier for the scheduled access.

The physical uplink shared channel is used for transmission of an RRC message. The RRC message is a signal/information that is processed in a radio resource control layer. The RRC message can include a UE Capability of the terminal apparatus 20. The UE Capability is information indicating a function supported by the terminal apparatus 20. The physical uplink shared channel is used for transmission of a MAC Control Element (CE). The MAC CE is a signal/information that is processed (transmitted) in a Medium Access Control (MAC) layer. For example, a power headroom may be included in the MAC CE and may be reported via the physical uplink shared channel. In other words, a MAC CE field is used to indicate a level of the power headroom. The uplink data may include an RRC message and a MAC CE.

The physical random access channel (e.g., Physical Random Access Channel, (PRACH) or New Radio PRACH (NRPRACH)) is used for transmission of a preamble used for random access. In the grant free access, the physical random access channel (random access procedure) can be omitted. In a case that the scheduling request can be used in the scheduled access, the random access procedure can be omitted.

In the uplink radio communication, an Uplink Reference Signal (UL RS) is used as an uplink physical signal. The uplink physical signal is not used for transmission of information output from higher layers, but is used by the physical layer. The uplink reference signal includes a DeModulation Reference Signal (DMRS) and a Sounding Reference Signal (SRS).

The demodulation reference signal is associated with transmission of the physical uplink shared channel or the physical uplink control channel. For example, the base station apparatus 10 uses the demodulation reference signal to perform channel compensation in a case of demodulating the physical uplink shared channel or the physical uplink control channel. A demodulation reference signal sequence may be generated in association with the cell ID of the base station apparatus 10. The demodulation reference signal sequence may be generated by application of a cyclic shift and an Orthogonal Cover Code (OCC).

The base station apparatus 10 can use the downlink control channel/RRC to notify the terminal apparatus 20 of a cyclic shift index associated with a parameter n DMRS of the cyclic shift amount. The n DMRS may include a configuration parameter notified using the downlink control channel and a configuration parameter notified using the RRC. A Zadoff-Chu sequence is used as a basic sequence $r(n)\_u, v$ of demodulation reference signals. The $r(n)\_u, v$ may be a Zadoff-Chu sequence using the cell ID as a seed. The basic sequence $r(n)\_u, v$ is cyclically shifted based on a parameter a for the cyclic shift amount obtained from the n DMRS. For example, in a case that the parameter a has 12 values, 12 cyclically shifted basic sequences $r(n)\_u, v\hat{}(\alpha)$ may be generated.

The OCC sequence w is multiplied by the cyclically shifted basic sequences $r(n)\_u, v\hat{}(\alpha)$. The demodulation reference signal may be mapped to one or more OFDM symbols. The multiplication of the OCC sequence w is performed for each OFDM symbol (for the time domain). For example, in a case that the demodulation reference signal is mapped over two OFDM symbols, an OCC sequence w (m) (m=0, 1) involves two patterns [1 1] and [1 −1]. In a case that w=[1 −1] (i.e., w(0)=1, w(1)=−1) is selected, a sequence mapped to M_SC^RS subcarriers in the first OFDM symbol is multiplied by 1 and a sequence mapped to M_SC^RS subcarriers in the second OFDM symbol is multiplied by −1. The pattern of the OCC sequence w(m) is associated with the OCC index. The base station apparatus 10 can notify the terminal apparatus 20 of the OCC index by using the downlink control channel/RRC. For example, in Equation (1), the use of an OCC with a sequence length of 2 may generate up to 24 demodulation reference signal sequences from one basic sequence. Note that the w(m) may be notified in association with the cyclic shift index. Note that the demodulation reference signal sequence r may be generated for each layer.

The demodulation reference signal sequence may multiply the frequency domain by a spreading code sequence. For example, the sequence mapped to the M_SC^RS subcarriers of each OFDM symbol is multiplied by the spreading code sequence. The spreading code sequence is the same as the spreading code sequence by which the physical uplink shared channel is multiplied. The sounding reference signal is unrelated to transmission of the physical uplink shared channel or the physical uplink control channel. For example, the base station apparatus 10 uses the sounding reference signal to measure an uplink channel state (CSI Measurement).

In FIG. 1, downlink physical channels described below are used for downlink radio communication using the scheduled access/grant free access. The downlink physical channels are used for transmission of information output from a higher layer.

Physical broadcast channel
Physical downlink control channel
Physical downlink shared channel The physical broadcast channel is used for broadcasting a Master Information Block (MIB, a Broadcast Channel (BCH)) shared by the terminal apparatuses 20. The MIB is system information. The physical broadcast channel includes system control information to be broadcasted. For example, the physical broadcast channel includes information such as a downlink system band, a System Frame Number (SFN), and a number of transmit antennas used by the base station apparatus 10. The physical broadcast channel may include configuration information about a channel including a retransmission request indication (e.g., a Physical Hybrid ARQ Indicator Channel (PHICH) or New Radio PHICH (NRPHICH), including a hybrid automatic repeat request indication). The physical broadcast channel may include information indicating whether the base station apparatus 10 supports the grant free access or not. The physical broadcast channel may include a portion or all of the configuration information related to the grant free access.

The physical downlink control channel is used for transmission of Downlink Control Information (DCI). For the downlink control information, multiple formats based on applications (also referred to as DCI formats) are defined. Each format is used depending on the application. The downlink control information includes control information for downlink data transmission and control information for uplink data transmission. The downlink control information can include information related to retransmission of uplink data (physical uplink shared channel).

The DCI format for downlink data transmission is used for scheduling of the physical downlink shared channel. The DCI format for downlink data transmission is also referred to as downlink grant (or downlink assignment). The DCI format for downlink data transmission includes downlink control information such as information related to resource allocation for the physical downlink shared channel and information related to a Modulation and Coding Scheme (MCS) for the physical downlink shared channel. The DCI format for downlink data transmission may include Transmission Power Control (TPC) for the physical uplink channel (e.g., the physical uplink control channel, physical uplink shared channel). The DCI format for downlink data transmission may include a portion or all of the configuration information related to the grant free access.

The DCI format for uplink data transmission is used to notify the terminal apparatus 20 of control information related to the transmission of the physical uplink shared channel. The DCI format for uplink data transmission can include uplink control information such as information related to the MCS for the physical uplink shared channel, information related to retransmission of uplink data (physical uplink shared channel), information related to the cyclic shift for the demodulation reference signal, transmit power control for the physical uplink channel, and a downlink Channel State Information (CSI, also referred to as reception quality information) request (CSI request). The DCI format for uplink data transmission may include multi-access resources/multi-access signature resources available to the terminal apparatus 20 (a group of available multi-access signatures or available multi-access signatures). The DCI format for uplink data transmission may include a portion or all of the configuration information related to the grant free access. A DCI format specific to the grant free access may be defined that is used to notify the configuration information related to the grant free access. Note that one or more pieces of information included in the DCI format for uplink data transmission can also be included in the DCI format for downlink data transmission.

The physical downlink control channel is generated by adding the Cyclic Redundancy Check (CRC) to the downlink control information. In the physical downlink control channel, the CRC is scrambled with the identifier (UE ID) of the terminal apparatus 20. For example, the CRC is scrambled with a Cell-Radio Network Temporary Identifier (C-RNTI).

The physical downlink shared channel is used for transmission of downlink data (downlink transport blocks and DL-SCH). The physical downlink shared channel is used for transmission of a system information message (System Information Block (SIB)). The system information message may include a system information block specific to the grant free access. For example, the system information block specific to the grant free access can include configuration information about multi-access physical resources (resources including time and frequency bands)/multi-access signature group/multi-access signature for the grant free access. The system information block specific to the grant free access may also include parameters used to identify uplink data (e.g., the parameters related to the configurations of reference signal/spreading code/interleaved pattern/transmit power control). Note that some or all of the system information messages can be included in the RRC message.

The physical downlink shared channel is used for transmission of the RRC message. The RRC message transmitted from the base station apparatus 10 may be shared by multiple terminal apparatuses 20 in the cell (the RRC message is specific to the cell). The information common to the terminal apparatuses 20 in the cell may be transmitted using the cell-specific RRC message. The RRC message transmitted from the base station apparatus 10 may be a dedicated message for a given terminal apparatus 20 (also referred to as dedicated signaling). Terminal apparatus-specific (user-specific) information may be transmitted using the dedicated message for the given terminal apparatus 20.

The RRC message can include a message for configuration information related to the grant free access (also referred to as grant free access configuration assist information). For example, the RRC message may include configuration information about multi-access physical resources (resources including time and frequency bands)/multi-access signature group/multi-access signature for the grant free access. The RRC message can also include may also include parameters used to identify uplink data (e.g., the parameters related to the configurations of reference signal/spreading code/interleaved pattern/transmit power control). The RRC message may be a dedicated message for the grant free access. Grant free access-specific information may be transmitted using a dedicated message for the grant free access.

The physical downlink shared channel is used for transmission of the MAC CE. The RRC message and/or the MAC CE is also referred to as higher layer signaling.

The physical downlink shared channel is generated by addition of the Cyclic Redundancy Check (CRC). The CRC is scrambled using the identifier (UE ID) of the terminal apparatus 20. In the downlink physical channel (physical downlink shared channel, physical downlink control channel), the identifier used to scramble the CRC may be defined as an identifier for the grant free access that is distinct from an identifier for the scheduled access. For example, in a case that the downlink physical channel is transmitted using the scheduled access and the uplink physical channel is transmitted using grant free access, different identifiers may be used for the uplink and the downlink.

In the downlink radio communication in FIG. 1, a Synchronization signal (SS) and a Downlink Reference Signal (DL RS) are used as downlink physical signals. The downlink physical signals are not used for transmission of information output from the higher layers, but are used by the physical layer.

The synchronization signal is used for the terminal apparatus 20 to take synchronization in the frequency domain and the time domain in the downlink. The synchronization may include subframe synchronization and Fast Fourier Transform (FFT) window synchronization. The downlink reference signal is used for the terminal apparatus 20 to perform channel compensation for the downlink physical channel. For example, the downlink reference signal is used to demodulate the physical broadcast channel, the physical downlink shared channel, and the physical downlink control channel. The downlink reference signal is used for the terminal apparatus 20 to calculate downlink channel state information (measurement). The reference signal used to demodulate the various channels may differ from the reference signal used for the measurement (e.g. in LTE, a Demodulation Reference Signal (DMRS), and a Cell-specific Reference Signal (CRS), a Channel State Information Reference Signal (CSI-RS), a Discovery Reference Signal (DRS), and the like).

The downlink physical channels and the downlink physical signals are also collectively referred to as downlink signals. The uplink physical channels and the uplink physical signals are also collectively referred to as uplink signals. The downlink physical channels and the uplink physical channels are also collectively referred to as physical channels. The downlink physical signals and the uplink physical signals are also collectively referred to as physical signals.

The BCH, the UL-SCH, and the DL-SCH are transport channels. Channels used in the Medium Access Control (MAC) layer are referred to as transport channels. A unit of the transport channel used in the MAC layer is also referred to as a Transport Block (TB) or a MAC Protocol Data Unit (PDU). The transport block is a unit of data that the MAC layer delivers to the physical layer. In the physical layer, the transport block is mapped to a codeword, and coding processing and the like are performed for each codeword.

Figure 3:
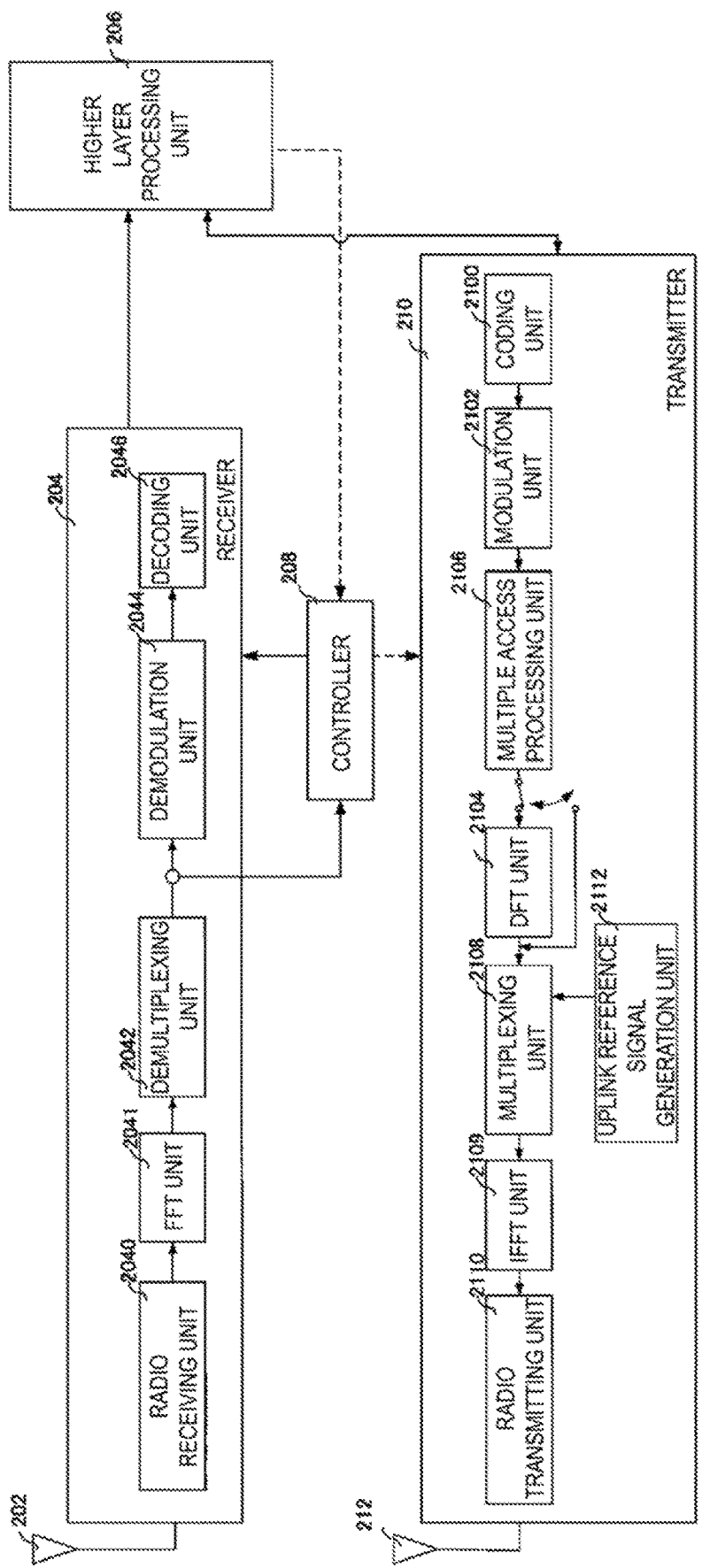
FIG. 3 is a schematic block diagram illustrating a configuration of a terminal apparatus 20 according to the first embodiment.

FIG. 3 is a schematic block diagram illustrating a configuration of the terminal apparatus 20 according to the present embodiment. The terminal apparatus 20 includes a receive antenna 202, a receiver (receiving step) 204, a higher layer processing unit (higher layer processing step) 206, a controller (control step) 208, a transmitter (transmitting step) 210, and a transmit antenna 212. The receiver 204 includes a radio receiving unit (radio receiving step) 2040, an FFT unit 2041 (FFT step), a demultiplexing unit (demultiplexing step) 2042, a demodulation unit (demodulating step) 2044, and a decoding unit (decoding step) 2046. The transmitter 210 includes a coding unit (coding step) 2100, a modulation unit (modulation step) 2102, a DFT unit (DFT step) 2104, a multiple access processing unit (multiple access processing step) 2106, a multiplexing unit (multiplexing step) 2108, a radio transmitting unit (radio transmitting step) 2110, a IFFT unit (IFFT step) 2109, and an uplink reference signal generation unit (uplink reference signal generation step) 2112.

The receiver 204 demultiplexes, demodulates, and decodes a downlink signal (downlink physical channel, downlink physical signal) received from the base station apparatus 10 via the receive antenna 202. The receiver 204 outputs a control channel (control information) separated from the received signal to the controller 208. The receiver 204 outputs a decoding result to the higher layer processing unit 206. The receiver 204 acquires information related to a configuration of the uplink physical channel and the uplink reference signal included in the received signal (referred to as configuration information related to uplink transmission). The configuration information related to the uplink transmission includes configuration information related to the grant free access. The downlink signal may include the UE ID of the terminal apparatus 20.

The radio receiving unit 2040 converts, by down-conversion, a downlink signal received through the receive antenna 202 into a baseband signal, removes unnecessary frequency components from the baseband signal, controls an amplification level in such a manner as to suitably maintain a signal level, orthogonally demodulates the signal based on an in-phase component and an orthogonal component of the received signal, and converts the resulting orthogonally-demodulated analog signal into a digital signal. The radio receiving unit 2040 removes a portion of the digital signal resulting from the conversion, the portion corresponding to a Cyclic Prefix (CP). The FFT unit 2041 performs a fast Fourier transform on the downlink signal from which CP has been removed (demodulation processing for OFDM modulation), and extracts the signal in the frequency domain.

The demultiplexing unit 2042 separates and extracts the downlink physical channel (physical downlink control channel, physical downlink shared channel, physical broadcast channel, or the like), the downlink reference signal, and the like included in the extracted downlink signal in the frequency domain. The demultiplexing unit 2042 includes a channel measurement function (channel measurement unit) using the downlink reference signal. The demultiplexing unit 2042 includes a channel compensation function (channel compensation unit) for the downlink signal using the channel measurement result. The demultiplexing unit outputs the physical downlink channel to the demodulation unit 2044/controller 208.

The demodulation unit 2044 demodulates the receive signal by using, for each of the modulation symbols of each downlink physical channel, a predetermined modulation scheme or a modulation scheme notified in advance with the uplink grant, such as BPSK, QPSK, 16QAM, 64QAM, or 256QAM.

The decoding unit 2046 decodes coded bits of each of the demodulated downlink physical channels at a predetermined coding rate of a predetermined coding scheme or at a coding rate notified in advance with the uplink grant, and outputs the decoded downlink data/configuration information related to the downlink reception/configuration information related to the uplink transmission to the higher layer processing unit 206.

The controller 208 controls the receiver 204 and the transmitter 210 by using the configuration information related to the downlink reception/configuration information related to the uplink transmission included in the downlink physical channel (physical downlink control channel, physical downlink shared channel, or the like). The configuration information related to the uplink transmission can include configuration information related to the grant free access. The controller 208 controls the uplink reference signal generation unit 2112 and the multiple access processing unit 2106 in accordance with the configuration information related to multi-access resources (multi-access physical resources/multi-access signature resources) included in the configuration information related to the grant free access. In FIG. 3, the controller 208 controls the uplink reference signal generation unit 2112 and the multiple access processing unit 2106 in accordance with parameters and multi-access signature resources used to generate the demodulation reference signal/identification signal calculated from the configuration information related to the grant free access. The controller 208 acquires the configuration information related to the downlink reception and/or the configuration information related to the uplink transmission from the receiver 204/higher layer processing unit 206. The configuration information related to the downlink reception/configuration information related to the uplink transmission may be acquired from the downlink control information (DCI) included in the downlink physical channel. The configuration information related to the downlink reception/configuration information related to the uplink transmission may be acquired from the downlink control information (DCI) included in the downlink physical channel. The configuration information related to the grant free access may be included in the physical downlink control channel/physical downlink shared channel/broadcast channel. The downlink physical channel may include a physical channel dedicated to the grant free access. In this case, a portion or all of the configuration information related to the grant free access may be acquired from the physical channel dedicated to the grant free access. Note that, in a case that the transmitter 210 transmits the physical uplink control channel, the controller 208 generates Uplink Control information (UCI) and outputs the resultant information to the transmitter 210. Note that some of the functions of the controller 108 can be included in the higher layer processing unit 102. Note that, in a case that the transmitter 210 transmits the physical uplink control channel, switching of whether the DFT is to be applied may be performed by the controller 208. Note that the controller 208 may control the transmitter 210 in accordance with the parameter of the CP length added to the data signal. The controller 208 may vary the CP length between the grant free access and the scheduled access such that, e.g., the CP for the grant free access is longer than the CP for the scheduled access. The controller 208 may control the transmitter 210 in accordance with the CP length parameter included in the configuration information related to the grant free access. Note that, in a case that the DFT is applied, a Zero-Tail DFTS-OFDM signal waveform may be used in which zero is interpolated at the head/tail of a signal sequence before the sequence is input to the DFT. In a case that the DFT is applied, a UW-DFTS-OFDM signal waveform may be used in which a specific sequence such as a Zadoff-Chu sequence is interpolated at the head/tail of a signal sequence before the sequence is input to the DFT. The DFTS-OFDM may be used in a case that a carrier frequency is lower than a prescribed value, and the Zero-Tail DFTS-OFDM/UW-DFTS-OFDM may be used in a case that the carrier frequency is higher than the prescribed value.

The controller 208 inputs, to the transmitter 210, information detected by the receiver 204 and related to resources used for the grant free access. The information related to the resources used for the grant free access is notified via the physical downlink control channel/physical downlink shared channel/broadcast channel. The information related to the resources used for the grant free access will be described below in detail.

The higher layer processing unit 206 performs processing of the medium access control (MAC) layer, the packet data convergence protocol (PDCP) layer, the radio link control (RLC) layer, and the radio resource control (RRC) layer. The higher layer processing unit 206 outputs, to the transmitter 210, information related to a function of the terminal apparatus (UE capability) supported by the terminal apparatus itself. For example, the higher layer processing unit 206 signals, in the RRC layer, information related to the function of the terminal apparatus.

The information related to the function of the terminal apparatus includes information indicating whether the terminal apparatus supports a prescribed function, or information indicating that the terminal apparatus has completed introduction and testing of a prescribed function. The information indicating whether the prescribed function is supported includes information indicating whether the introduction and testing of the prescribed function have been completed. In a case that the terminal apparatus supports the prescribed function, the terminal apparatus transmits information (parameters) indicating whether the prescribed function is supported. In a case that the terminal apparatus does not support the prescribed function, the terminal apparatus may be configured not to transmit information (parameters) indicating whether the prescribed function is supported. In other words, whether the prescribed function is supported is reported by whether information (parameters) indicating whether the prescribed function is supported is transmitted. The information (parameters) indicating whether the prescribed function is supported may be reported using one bit of 1 or 0.

The information related to the function of the terminal apparatus includes information indicating that the grant free access is supported. In a case that multiple functions corresponding to the grant free access are provided, the higher layer processing unit 206 can transmit information indicating whether the grant free access is supported on a function-by-function basis. The information indicating that the grant free access is supported includes information indicating the multi-access physical resource and multi-access signature resource supported by the terminal apparatus. The information indicating that the grant free access is supported may include a configuration of a lookup table for the configuration of the multi-access physical resource and the multi-access signature resource. The information indicating that the grant free access is supported may include some or all of an antenna port, a capability corresponding to multiple tables indicating a scrambling identity and the number of layers, a capability corresponding to a predetermined number of antenna ports, and a capability corresponding to a prescribed transmission mode. The transmission mode is determined by the number of antenna ports, transmission diversity, the number of layers, and whether support of the grant free access and the like are provided.

The higher layer processing unit 206 manages various types of configuration information about the terminal apparatus. Some of the various types of configuration information are input to the controller 208. The various types of configuration information are received from the base station apparatus 10 via the receiver 204 using the downlink physical channel. The various types of configuration information include configuration information related to the grant free access input from the receiver 204. The configuration information related to the grant free access includes configuration information about the multi-access resources (multi-access physical resources and multi-access signature resources). For example, the configuration information related to the grant free access may include a configuration related to the multi-access signature resource (configuration related to processing performed based on a mark for identifying the uplink physical channel transmitted by the terminal apparatus 20), such as an uplink resource block configuration (the number of OFDM symbols per resource block/the number of subcarriers), a configuration of the demodulation reference signal/identification signal (reference signal sequence, cyclic shift, OFDM symbols to be mapped, and the like), a spreading code configuration (Walsh code, Orthogonal Cover Code (OCC), sparse code, spreading rates of these spreading codes, and the like), an interleave configuration, a transmit power configuration, a transmit and/or receive antenna configuration, and a transmit and/or receive beamforming configuration. These multi-access signature resources may be directly or indirectly associated (linked) with one another. The association of the multi-access signature resources is indicated by a multi-access signature process index. The configuration information related to the grant free access may include the configuration of the look-up table for the configuration of the multi-access physical resource and multi-access signed resource. The configuration information related to the grant free access may include setup of the grant free access, information indicating release, ACK/NACK reception timing information for uplink data signals, retransmission timing information for uplink data signals, and the like.

Based on the configuration information related to the grant free access, the higher layer processing unit 206 manages multi-access resources (multi-access physical resources, multi-access signature resources) in which uplink data (transport blocks) is transmitted in a grant-free. Based on the configuration information related to the grant free access, the higher layer processing unit 206 outputs, to the controller 208, information used to control the transmitter 210. The higher layer processing unit 206 acquires the UE ID of the terminal apparatus itself from the receiver 204/ controller 208. The UE ID can also be included in configuration information related to the grant free access.

The higher layer processing unit 206 outputs, to the transmitter 210, uplink data (e.g., DL-SCH) generated by a user operation or the like. The higher layer processing unit 206 can also output, to the transmitter 210, uplink data generated without intervention of a user operation (for example, data acquired by the sensor). The uplink data may include a field storing the UE ID. The higher layer processing unit 206 adds the CRC to the uplink data. CRC parity bits are generated using the uplink data. The CRC parity bits are scrambled with the UE ID allocated to the terminal apparatus itself (the scrambling is also referred to as an exclusive-OR operation, masking, or ciphering). As the UE ID, a terminal apparatus-specific identifier for the grant free access may be used.

In a case that uplink data to be transmitted is generated, the transmitter 210 transmits the physical uplink shared channel without receiving the UL Grant, based on the configuration information related to the grant free access and transmitted from the base station apparatus 10. The transmitter 210 generates the physical uplink shared channel and the demodulation reference signal/identification signal associated with the physical uplink shared channel in accordance with the configuration related to the grant free access and input from the controller 208.

The coding unit 2100 codes the uplink data input from the higher layer processing unit 206 by using the predetermined coding scheme/coding scheme configured by the controller 208 (the coding includes repetitions). The coding scheme may involve application of convolutional coding, turbo coding, Low Density Parity Check (LDPC) coding, Polar coding, and the like. The LDPC code may be used for data transmission, whereas the Polar code may be used for transmission of the control information. Different error correction coding may be used depending on the uplink channel to be used. Different error correction coding may be used depending on the size of the data or control information to be transmitted. For example, the convolution code may be used in a case that the data size is smaller than a predetermined value, and otherwise the correction coding described above may be used. For the coding described above, in addition to a coding rate of 1/3, a mother code such as a low coding rate of 1/6 or 1/12 may be used. In a case that a coding rate higher than the mother code is used, the coding rate used for data transmission may be achieved by rate matching (puncturing). The modulation unit 2102 modulates coded bits input from the coding unit 2100, in compliance with a modulation scheme notified in the downlink control information or a modulation scheme predetermined for each channel, such as BPSK, QPSK, 16QAM, 64QAM, or 256QAM (the modulation scheme may include $\pi/2$ shift BPSK or $\pi/2$ shift QPSK).

The multiple access processing unit 2106 performs signal conversion such that the base station apparatus 10 can achieve signal detection even in a case that multiple data are multiplexed on a sequence output from the modulation unit 2102 in accordance with multi-access signature resource input from the controller 208. In a case that the multi-access signature resource is configured as spreading, multiplication by the spreading code sequence is performed according to the configuration of the spreading code sequence. The configuration of the spreading code sequence may be associated with other configurations of the grant free access such as the demodulation reference signal/identification signal. Note that the multiple access processing may be performed on the sequence after the DFT processing. Note that, in a case that interleaving is configured as a multi-access signature resource in the multiple access processing unit 2106, the multiple access processing unit 2106 can be replaced with the interleave unit. The interleave unit performs interleave processing on the sequence output from the DFT unit in accordance with the configuration of the interleave pattern input from the controller 208. In a case that code spreading and interleaving are configured as a multi-access signature resource, the multiple access processing unit 2106 of the transmitter 210 performs spreading processing and interleaving. A similar operation is performed even in a case that any other multi-access signature resource is applied, and the sparse code or the like may be applied.

The multiple access processing unit 2106 inputs the multiple-access-processed signal to the DFT unit 2104 or the multiplexing unit 2108 depending on whether a DFTS-OFDM signal waveform or an OFDM signal waveform is used. In a case that the DFTS-OFDM signal waveform is used, the DFT unit 2104 rearranges multiple-access-processed modulation symbols output from the multiple access processing unit 2106 in parallel and then performs Discrete Fourier Transform (DFT) processing on the rearranged modulation symbols. Here, a zero symbol sequence may be added to the modulation symbols, and the DFT may then be performed to provide a signal waveform in which, instead of a CP, a zero interval is used for a time signal resulting from IFFT. A specific sequence such as Gold sequence or a Zadoff-Chu sequence may be added to the modulation symbols, and the DFT may then be performed to provide a signal waveform in which, instead of a CP, a specific pattern is used for the time signal resulting from the IFFT. In a case that the OFDM signal waveform is used, the DFT is not applied, and thus the multiple-access-processed signal is input to the multiplexing unit 2108. The controller 208 performs control using a configuration of the zero symbol sequence (the number of bits in the symbol sequence and the like) and a configuration of the specific sequence (sequence seed, sequence length, and the like), the configurations being included in the configuration information related to the grant free access.

The uplink reference signal generation unit 2112 generates a demodulation reference signal in accordance with the configuration information about the demodulation reference signal input from the controller 208. The configuration information about the demodulation reference signal/identification signal may be associated with a configuration related to the grant free access (configuration related to the multi-access physical resource/multi-access signature resource). The configuration information about the demodulation reference signal/identification signal is used to generate a sequence acquired according to a predetermined rule (e.g., Equation (1)), based on a physical cell identifier (also referred to as a physical cell identity (PCI), a cell ID, or the like) for identifying the base station apparatus 10, the number of subcarriers (bandwidth) to which the uplink reference signal is mapped, the number of OFDM symbols, the cyclic shift, the OCC sequence, and the like.

The multiplexing unit 2108 multiplexes (maps) the uplink physical channel signal (output signal from the DFT unit 2104) and the uplink reference signal for each transmit antenna port. The multiplexing unit 2108 maps the uplink physical channel and the uplink reference signal to resource elements for each transmit antenna port. In a case that the SCMA is used, the multiplexing unit 2108 maps the uplink physical channel to resource elements in accordance with an SCMA resource pattern input from the controller 208. The SCMA resource pattern may be included in the configuration information related to the grant free access.

The IFFT unit 2109 performs the Inverse Fast Fourier Transform (IFFT) on the multiplexed signal to perform DFTS-OFDM (SC-FDMA) modulation or OFDM modulation to generate SC-FDMA symbols or OFDM symbols. The radio transmitting unit 2110 adds CPs to the SC-FDMA symbols to generate a baseband digital signal. Furthermore, the radio transmitting unit 2110 converts the baseband digital signal into an analog signal, removes the excess frequency components from the analog signal, converts the signal into a carrier frequency by up-conversion, performs power amplification, and transmits the resultant signal to the base station apparatus 10 via the transmit antenna 212. The radio transmitting unit 2110 includes a transmit power control function (transmit power controller). The transmit power control follows configuration information about the transmit power input from the controller 208. The configuration information about the transmit power is associated with the configuration information related to the grant free access. In a case that FBMC, UF-OFDM, or F-OFDM are applied, filtering is performed on the SC-FDMA symbols (or OFDM symbols) in units of subcarriers or sub-bands.

In data transmission in the grant free access, the terminal apparatus 20 can perform at least one of mMTC data transmission (hereinafter referred to as an mMTC transmission mode) satisfying at least one of data for which a long delay is acceptable and data not requiring very high reliability, and URLLC data transmission (hereinafter referred to as a URLLC transmission mode) requiring a low delay and high reliability. The mMTC transmission mode may transmit data for which a long delay is acceptable, and the URLLC transmission mode may transmit data for which a low delay is required. The mMTC transmission mode and the URLLC transmission mode may be data transmission based on mMTC configuration information (parameters, configuration information) and data transmission based on URLLC configuration information parameters, configuration information). The mMTC and URLLC configuration information includes a data size, a retransmission count, a bandwidth used for data transmission, a transmit power parameter, a data format, the number of OFDM symbols used for a single data transmission, a subcarrier spacing, a carrier frequency used for data transmission, the number of antenna ports/physical antennas used for data transmission, a modulation order and a coding rate used for data transmission, and the error correction coding scheme, at least one of which may be configured for each transmission mode. So long as any piece of the configuration information is notified for each transmission mode, the configuration value may be the same or different among the transmission modes. The mMTC transmission mode and the URLLC transmission mode may be data transmission on dedicated physical resources for mMTC and data transmission on dedicated physical resources for URLLC. The mMTC transmission mode and the URLLC transmission mode may be data transmission on a dedicated multi-access signature resource for mMTC and data transmission on a dedicated multi-access signature resource for URLLC.

Figure 4:
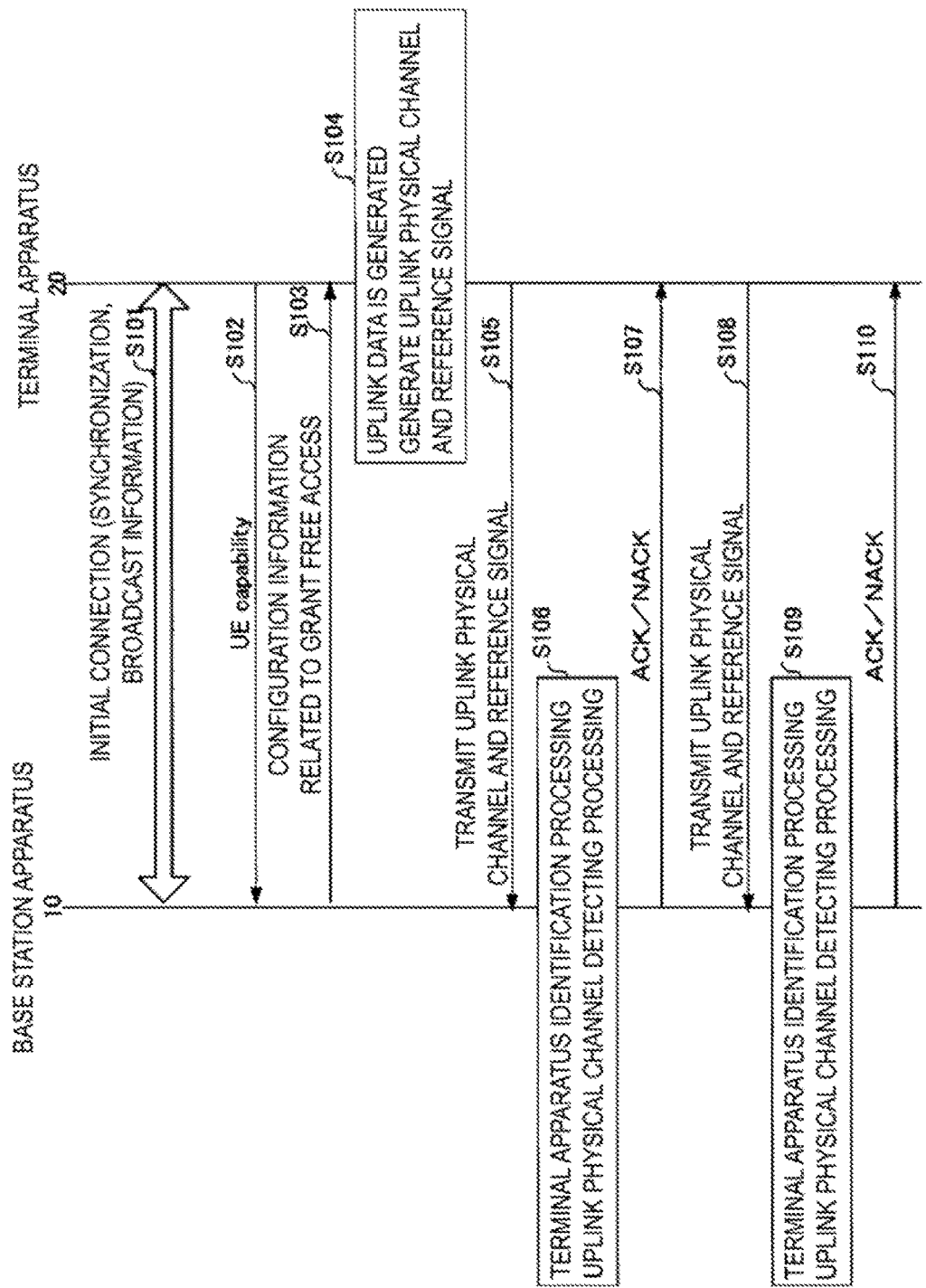
FIG. 4 is a diagram illustrating an example of a sequence between a base station apparatus and a terminal apparatus in grant free access according to the first embodiment.

FIG. 4 is a diagram illustrating an example of a sequence between the base station apparatus and the terminal apparatus in the grant free access according to the present embodiment. The base station apparatus 10 periodically transmits a synchronization signal and a broadcast channel in accordance with a prescribed radio frame format in the downlink. The terminal apparatus 20 performs an initial connection by using the synchronization signal, the broadcast channel, and the like (S101). The terminal apparatus 20 performs frame synchronization and symbol synchronization in the downlink by using the synchronization signal. In a case that the broadcast channel includes the configuration information related to the grant free access, the terminal apparatus 20 acquires the configuration related to the grant free access in the connected cell. The base station apparatus 10 can notify each terminal apparatus 20 of the UE ID in the initial connection.

The terminal apparatus 20 transmits the UE Capability (S102). The base station apparatus 10 can identify, by using the UE Capability, whether the terminal apparatus 20 supports the grant free access. Note that in S101 to S103, the terminal apparatus 20 can transmit the physical random access channel to acquire resources for uplink synchronization and an RRC connection request.

The base station apparatus 10 transmits the configuration information related to the grant free access to each of the terminal apparatuses 20 by using the RRC messages, the SIB, or the like (S103). The configuration information related to the grant free access includes the allocation of the multi-access signature resource. The terminal apparatus 20 having received the configuration information related to the grant free access acquires a transmission parameter such as the multi-access signature resource applied to the uplink data. Note that a portion or all of the configuration information related to the grant free access may be notified using the downlink control information.

The terminal apparatus 20 supporting the grant free access generates a demodulation reference signal allocated to the terminal itself in a case that uplink data is generated. Furthermore, the demodulation reference signal and the multi-access signature resource may be associated with each other, and such information is used to generate an uplink physical channel (S104). The terminal apparatus 20 transmits the uplink physical channel and the demodulation reference signal without obtaining the UL Grant from the base station apparatus 10 (initial transmission) (S105). Beside the demodulation reference signal, an identification signal may be transmitted that is used to identify the terminal apparatus 20 to which the base station apparatus 10 has transmitted data.

The base station apparatus 10 performs identification processing on the terminal apparatus 20 by using the demodulation reference signal/identification signal allocated to each terminal apparatus 20. Furthermore, the base station apparatus 10 performs uplink physical channel detection processing on the identified terminal apparatus 20 by using the demodulation reference signal/identification signal, the multi-access signature resource, and the like. The base station apparatus 10 further performs error detection processing using the UE ID allocated to each terminal apparatus (S106). Based on the result of the error detection, the base station apparatus 10 transmits the ACK/NACK to the terminal apparatus 20 (S107). In S106, in a case that no errors are detected, the base station apparatus 10 determines to have correctly completed the identification of the terminal apparatus 20 and the reception of the uplink data transmitted by the terminal apparatus, and transmits the ACK. On the other hand, in a case that an error is detected in S106, the base station apparatus 10 determines to have incorrectly identified the terminal apparatus 20 or received the uplink data transmitted by the terminal apparatus, and transmits the NACK.

The terminal apparatus 20 having received the NACK again transmits (retransmits) the uplink physical channel and the reference signal (S108). In a case that the base station apparatus 10 indicates a multi-access signature resource for retransmission, the terminal apparatus 20 changes the multi-access signature resource in accordance with a predetermined pattern or the lookup table or the like specified in the control information. The base station apparatus 10 performs uplink physical channel detection processing on the re-transmitted uplink physical channel (S109). The base station apparatus 10 further performs error detection processing using the UE ID allocated to each terminal apparatus (S109). Based on the result of the error detection, the base station apparatus 10 transmits the ACK/NACK to the terminal apparatus 20 (S110).

The grant free access may involve application of synchronous HARQ in which the time from the data transmission from the terminal apparatus 20 until the ACK/NACK transmission from the base station apparatus 10 is equal to a predetermined time, and asynchronous HARQ in which the base station apparatus 10 can change ACK/NACK transmission timings. In the mMTC transmission mode, data is transmitted for which a long delay is acceptable, and thus the synchronous HARQ or the asynchronous HARQ may be used. On the other hand, in the URLLC transmission mode, data is transmitted that requires low delay and high reliability. Thus, in a case that the base station apparatus 10 has failed to correctly detect data, retransmission control with a low delay is necessary. For example, there is a need for synchronous HARQ in which the ACK/NACK is transmitted in a fixed, short time and asynchronous HARQ in which the base station apparatus 10 transmits the ACK/NACK in a short time.

Two types of resources can be prepared for the grant free access in the mMTC transmission mode and the URLLC transmission mode. First, a first type of resource is a Semi Static-Grant Free Access (SS-GFA) resource that is a resource for semi-static grant free access using the control information about the physical downlink broadcast channel, the RRC message, the SIB, or the like, the resource is specified as a fixed frequency resource or a resource with a fixed pattern. The SS-GFA resource is changed at a relatively long cycle. A second type of resource is a Dynamic-GFA (D-GFA) resource that is a resource for dynamic grant free access using DCI on the physical downlink control channel, and the resource is specified in units of subframes/slots/mini-slots/OFDM symbols. The D-GFA resource is changed at a relatively short cycle. Note that, examples of notification of the D-GFA resource using the DCI includes that, in a case that the terminal apparatus 20 receives the DCI in the k-th subframe, the D-GFA resource is allocated to the (k+n)-th subframe. Here, it is assumed that n is a positive integer and is predetermined between the base station apparatus 10 and the terminal apparatus 20 or that the configuration information is preliminarily notified by the broadcast channel/RRC message/SIB and shared as a parameter of the grant free access. The base station apparatus 10 may determine the allocation of frequency resources for the scheduled access and then notify the terminal apparatus 20 of free frequency resources as the D-GFA using the DCI. As a resource for the grant free access, both an SS-GFA resource and a D-GFA resource can be used.

Figure 5:
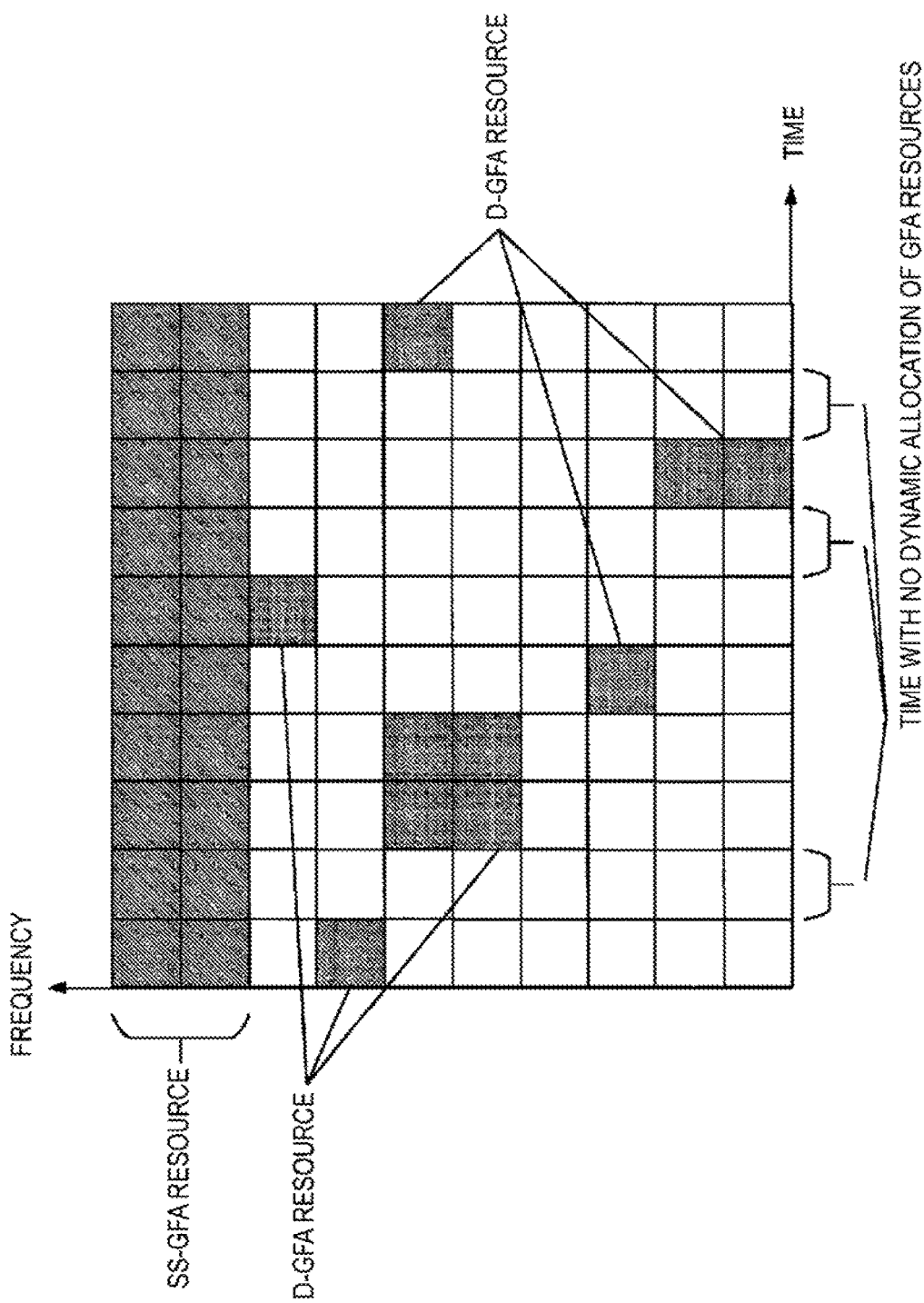
FIG. 5 is a diagram illustrating an example of an uplink radio frame configuration according to the first embodiment.

FIG. 5 is a diagram illustrating an example of an uplink radio frame configuration according to the present embodiment. In FIG. 5, the vertical axis indicates frequency and the horizontal axis indicates time. The frequency on the vertical axis may be, for example, a resource block for which one unit includes a subcarrier or multiple subcarriers (e.g., 12 subcarriers) or a resource block group including multiple resource blocks. The time on the horizontal axis may be, for example, a mini-slot for which one unit includes an OFDM symbol or multiple OFDM symbols, or a slot including 7 OFDM symbols, or a subframe including 14 OFDM symbols. Hatched portions (left downward sloping lines) in FIG. 5 correspond to SS-GFA resources and shaded portions in FIG. 5 correspond to D-GFA resources. FIG. 5 illustrates a case in which SS-GFA resources are allocated to fixed frequency resources, and the terminal apparatus 20 using the SS-GFA resources performs data transmission in the grant free access on the frequency resources. On the other hand, the terminal apparatus 20 capable of using the D-GFA resources performs data transmission in the grant free access using the frequency resource indicated in the control information in a case that the control information about the D-GFA resources is detected during data transmission. In a case of detecting no control information about the D-GFA resources during data transmission (for example, during the time when none of the GFA resources in FIG. 5 are dynamically allocated), the terminal apparatus 20 capable of using the D-GFA resources may perform data transmission in the grant free access using the SS-GFA resource, or may perform data transmission in the scheduled access using the scheduling request.

Figure 6:
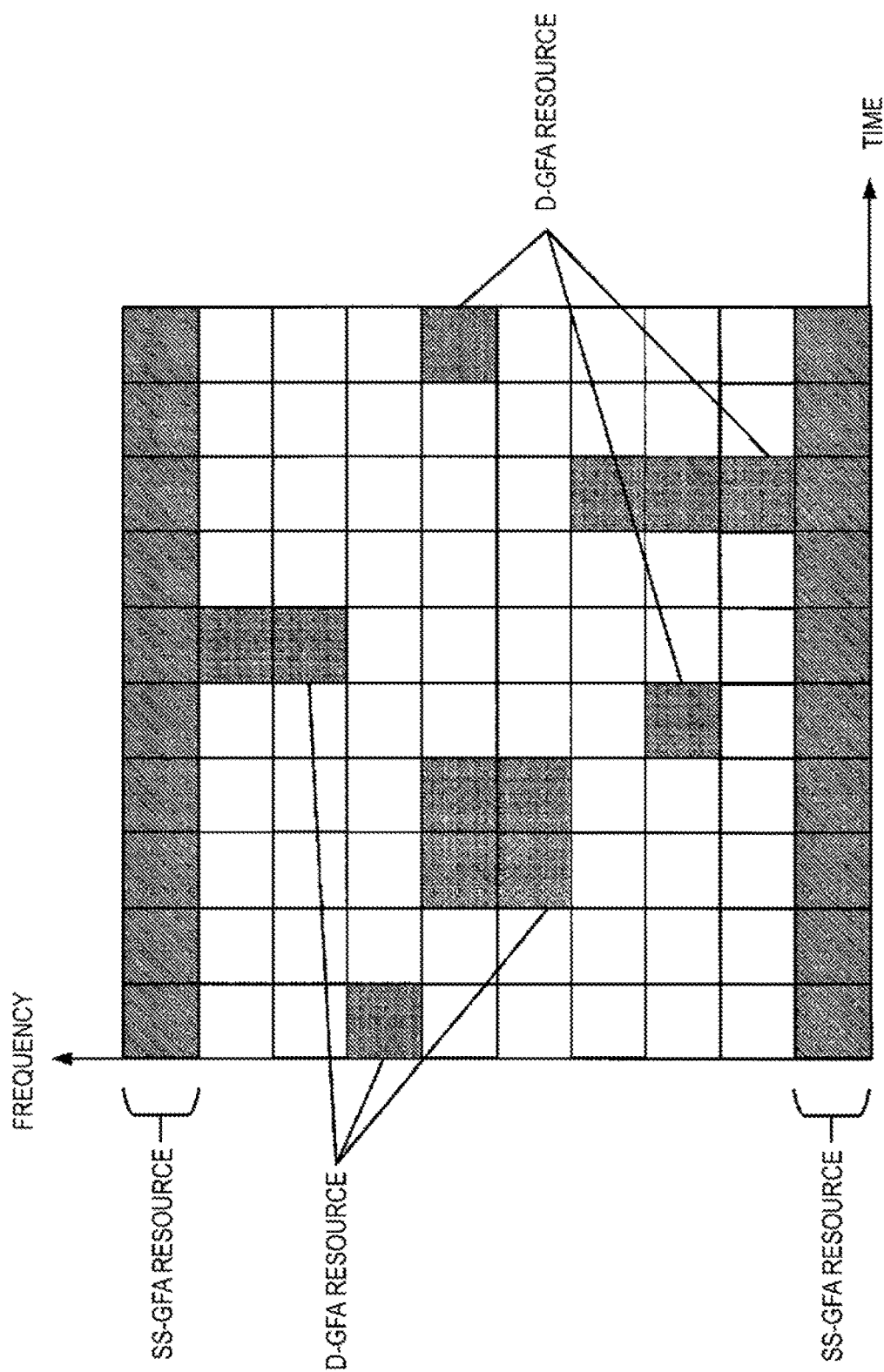
FIG. 6 is a diagram illustrating an example of an uplink radio frame configuration according to the first embodiment.

FIG. 6 is a diagram illustrating an example of an uplink radio frame configuration according to the present embodiment. Hatched portions (left downward sloping lines) in FIG. 6 correspond to the SS-GFA resources and shaded portions in FIG. 6 correspond to the D-GFA resources. FIG. 6 illustrates a case where the base station apparatus 10 uses the control information about the physical downlink broadcast channel, the RRC message, the SIB, or the like, to configure the SS-GFA resources using non-contiguous frequency resources. In this case, the terminal apparatus 20 may select one of the SS-GFA resources to perform data transmission in the grant free access. In a case that the frequency resources separated from each other as illustrated in FIG. 6 (e.g., the frequency resources at opposite ends of the physical uplink shared channel) are specified as the SS-GFA resources, the terminal apparatus 20 can mitigate the effects of frequency selective fading by varying the SS-GFA resource used during retransmission. The base station apparatus 10 may constantly map the SS-GFA resources at the opposite ends of one access unit of a system band, a frequency band of the serving cell, a component carrier, or the like, and may use the control information to notify the bandwidth to be used.

Figure 7:
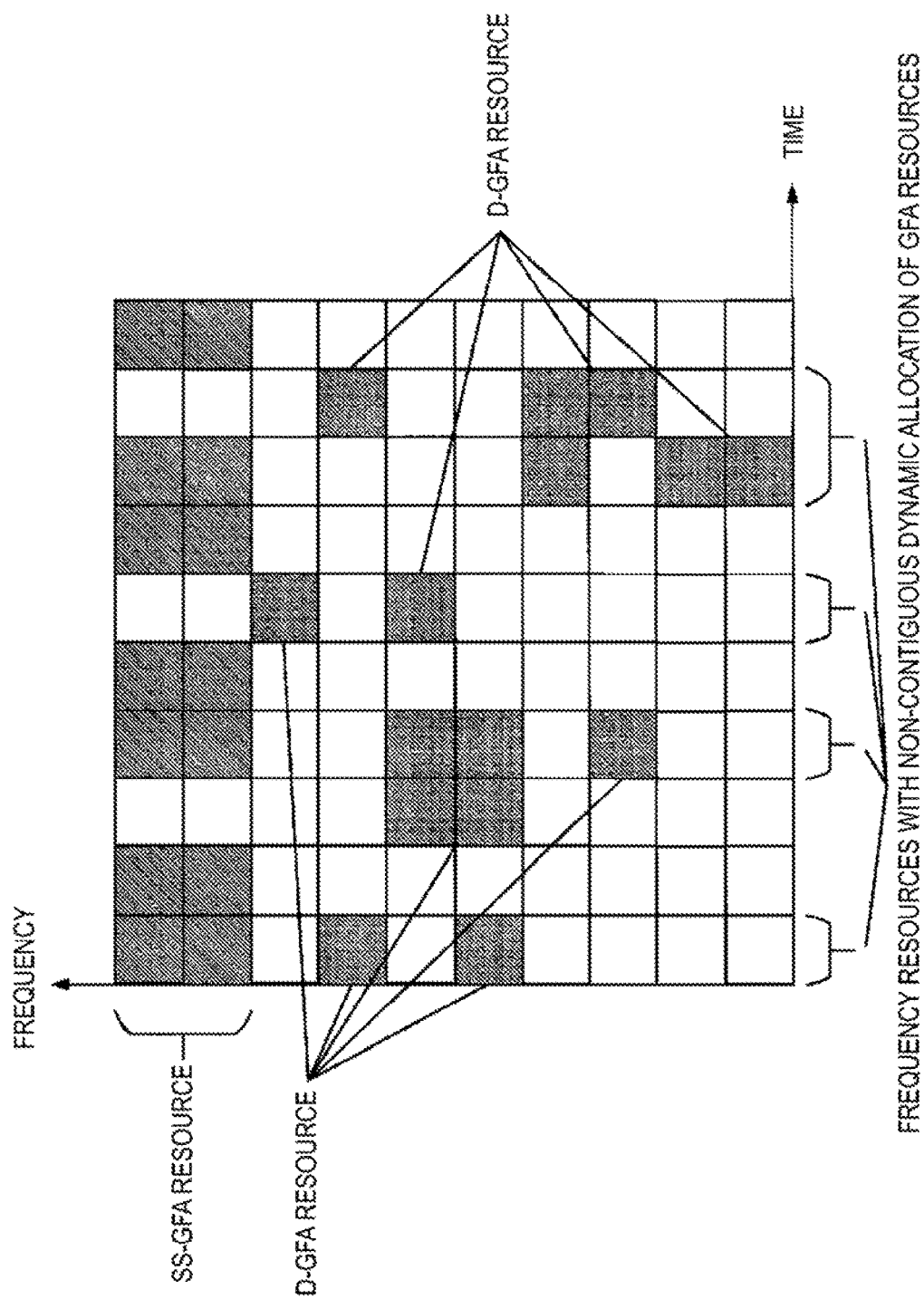
FIG. 7 is a diagram illustrating an example of an uplink radio frame configuration according to the first embodiment.

FIG. 7 is a diagram illustrating an example of an uplink radio frame configuration according to the present embodiment. Hatched portions (left downward sloping lines) in FIG. 7 correspond to the SS-GFA resources and shaded portions in FIG. 7 correspond to the D-GFA resources. FIG. 7 illustrates a case where the SS-GFA resources are specified using fixed frequency resources, and are periodically enabled or disabled for data transmission in the grant free access. In FIG. 7, the terminal apparatus 20 may transmit data on the D-GFA resources in a case that the control information about the D-GFA resources is detected while the SS-GFA resources are disabled. In a case that the D-GFA resources indicate non-contiguous frequencies as illustrated in FIG. 7, the terminal apparatus 20 may select any one of the D-GFA resources to perform data transmission in the grant free access. Although FIG. 5 to FIG. 7 illustrate examples in which the SS-GFA resources are configured using fixed frequency resources, an aspect of the present invention is not limited to this example. For example, a pattern may be used in which the SS-GFA resource is a temporally varying frequency resource (units of subframes/slots/mini-slots/OFDM symbols). In this case, the base station apparatus 10 may notify the terminal apparatus 20 of a pattern of the SS-GFA resource using the control information.

FIG. 5 to FIG. 7 illustrate an example in which the D-GFA resources are notified using time and frequency resources. However, only the time resources (OFDM symbols, mini-slots, subframes, and the like) may be specified, and limiting the frequency resources may be avoided. In this case, the multiple terminal apparatuses 20 may determine frequency resources to be freely used. Note that, instead of being freely selectable by the terminal, the frequency resource to be used may be uniquely determined or limited depending on transmission parameters such as the ID of the UE, access scheme (whether OFDM or DFT-S-OFDM) and the number of layers. In this case, the terminal apparatus may determine the frequency resource to be used from the resources other than the SS-GFA resources, or may determine the frequency resource to be used from the resources other than the physical uplink control channel.

Figure 8:
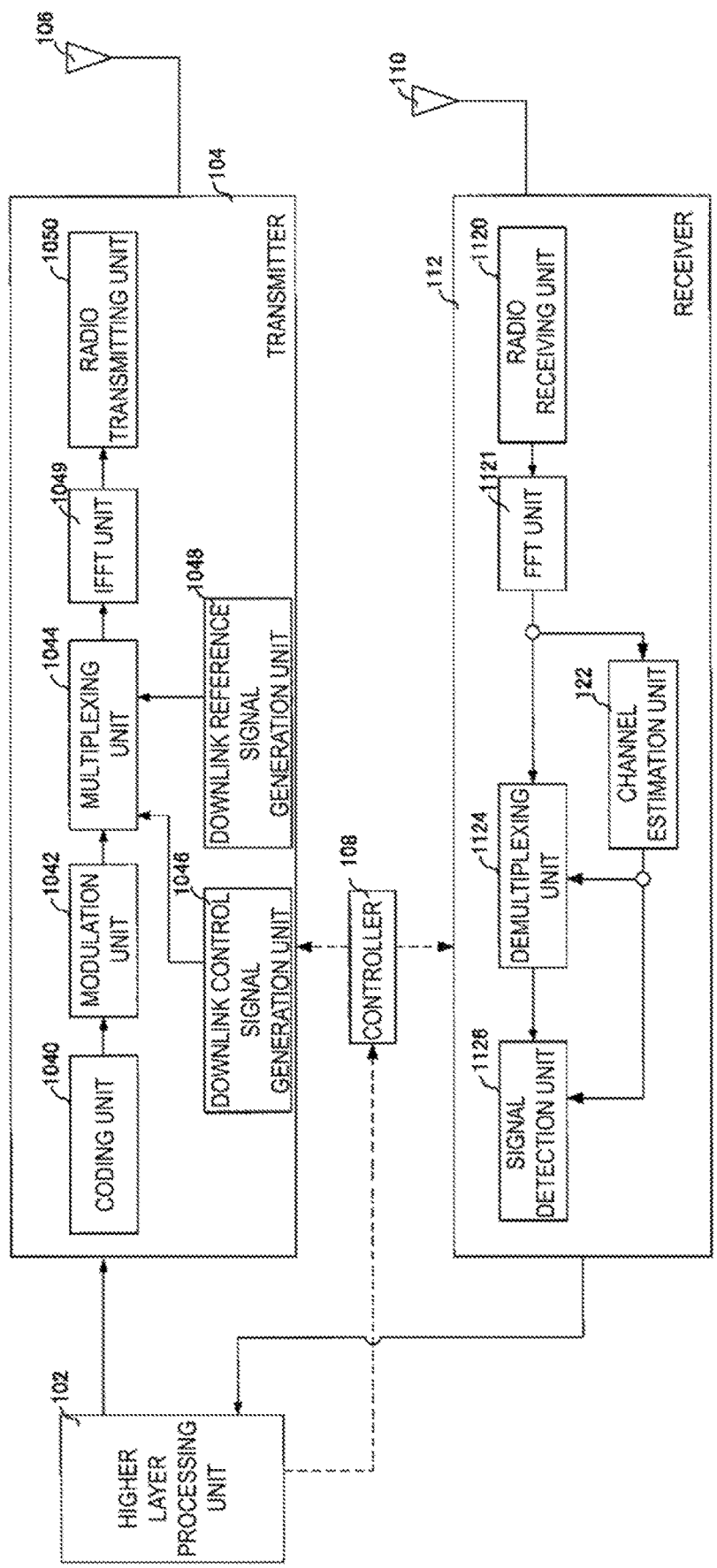
FIG. 8 is a schematic block diagram illustrating a configuration of a base station apparatus 10 according to the first embodiment.

FIG. 8 is a schematic block diagram illustrating a configuration of the base station apparatus 10 according to the present embodiment. The base station apparatus 10 includes a higher layer processing unit (higher layer processing step) 102, a transmitter (transmitting step) 104, a transmit antenna 106, a controller (control step) 108, a receive antenna 110, and a receiver (receiving step) 112. The transmitter 104 includes a coding unit (coding step) 1040, a modulation unit (modulating step) 1042, a multiplexing unit (multiplexing step) 1044, a downlink control signal generation unit (downlink control signal generating step) 1046, a downlink reference signal generation unit (downlink reference signal generating step) 1048, an IFFT unit 1049 (IFFT step), and a radio transmitting unit (radio transmitting step) 1050. The receiver 112 includes a radio receiving unit (radio receiving step) 1120, an FFT unit (FFT step) 1121, a channel estimation unit (channel estimating step) 1122, a demultiplexing unit (demultiplexing step) 1124, and a signal detection unit (signal detecting step) 1126.

The higher layer processing unit 102 performs processing of layers higher than the physical layer, such as the Medium Access Control (MAC) layer, the Packet Data Convergence Protocol (PDCP) layer, the Radio Link Control (RLC) layer, and the Radio Resource Control (RRC) layer. The higher layer processing unit 102 generates information needed to control the transmitter 104 and the receiver 112, and outputs the resultant information to the controller 108. The higher layer processing unit 102 outputs downlink data (e.g., the DL-SCH), broadcast information (e.g., the BCH), a Hybrid Automatic Request indicator (HARQ indicator), and the like to the transmitter 104.

The higher layer processing unit 102 receives information related to the terminal apparatus, such as the function of the terminal apparatus (UE capability) and the like, from the terminal apparatus 20 (via the receiver 112). The information related to the terminal apparatus includes information indicating that the grant free access is supported, information indicating whether the grant free access is supported on a function-by-function basis. The information indicating that the grant free access is supported and the information indicating whether the grant free access is supported on a function-by-function basis may be distinguished from each other based on the transmission mode. The higher layer processing unit 102 can determine whether the grant free access is supported, depending on the transmission mode supported by the terminal apparatus 20.

The higher layer processing unit 102 generates or acquires from a higher node, system information (MIB, SIB) to be broadcasted. The higher layer processing unit 102 outputs, to the transmitter 104, the system information to be broadcasted. The system information to be broadcasted can include information indicating that the base station apparatus 10 supports the grant free access. The higher layer processing unit 102 can include, in the system information, a portion or all of the configuration information related to the grant free access (such as the configuration information related to the multi-access resources such as the multi-access physical resource, the multi-access signature resource). The uplink system control information is mapped to the physical broadcast channel/physical downlink shared channel in the transmitter 104.

The higher layer processing unit 102 generates or acquires from a higher node, downlink data (transport blocks) to be mapped to the physical downlink shared channel, system information (SIB), an RRC message, a MAC CE, and the like, and outputs the downlink data and the like to the transmitter 104. The higher layer processing unit 102 can include, in the higher layer signaling, some or all of the configuration information related to the grant free access and parameters indicating setup and/or release of the grant free access. The higher layer processing unit 102 may generate a dedicated SIB for notifying the configuration information related to the grant free access.

The higher layer processing unit 102 maps the multi-access resources to the terminal apparatuses 20 supporting the grant free access. The base station apparatus 10 may hold a lookup table of configuration parameters for the multi-access signature resource. The higher layer processing unit 102 allocates each configuration parameter to the terminal apparatuses 20. The higher layer processing unit 102 uses the multi-access signature resource to generate configuration information related to the grant free access for each terminal apparatus. The higher layer processing unit 102 generates a downlink shared channel including a portion or all of the configuration information related to the grant free access for each terminal apparatus. The higher layer processing unit 102 outputs, to the controller 108/transmitter 104, the configuration information related to the grant free access.

The higher layer processing unit 102 configures a UE ID for each terminal apparatus and notifies the terminal apparatus of the UE ID. As the UE ID, a Cell Radio Network Temporary Identifier (RNTI) can be used. The UE ID is used for the scrambling of the CRC added to the downlink control channel and the downlink shared channel. The UE ID is used for scrambling of the CRC added to the uplink shared channel. The UE ID is used to generate an uplink reference signal sequence. The higher layer processing unit 102 may configure a grant free access-specific UE ID. The higher layer processing unit 102 may configure the UE ID separately depending on whether or not the terminal apparatus supports the grant free access. For example, in a case that the downlink physical channel is transmitted in the scheduled access and the uplink physical channel is transmitted in the grant-free access, the UE ID for the downlink physical channel may be configured separately from the UE ID for the downlink physical channel. The higher layer processing unit 102 outputs the configuration information related to the UE ID to the transmitter 104/controller 108/receiver 112.

The higher layer processing unit 102 determines the coding rate, the modulation scheme (or MCS), and the transmit power for the physical channels (physical downlink shared channel, physical uplink shared channel, and the like). The higher layer processing unit 102 outputs the coding rate/modulation scheme/transmit power to the transmitter 104/controller 108/receiver 112. The higher layer processing unit 102 can include the coding rate/modulation scheme/transmit power in higher layer signaling.

Based on the various types of information input from the higher layer processing unit 102, the controller 108 controls the transmitter 104 and the receiver 112. The controller 108 generates the downlink control information (DCI), based on the information input from the higher layer processing unit 102, and outputs the generated information to the transmitter 104. The controller 108 may include some or all of the configuration information related to the grant free access in the downlink control information.

The controller 108 controls the receiver 112 in accordance with the configuration information related to the grant free access and input from the higher layer processing unit 102. The controller 108 identifies channel estimation and a terminal apparatus for the channel estimation unit 1122 in accordance with the multi-access signature resource and the demodulation reference signal sequence/identification signal input from the higher layer processing unit 102. The controller 108 outputs, to the signal detection unit 1126, the identification result for the terminal apparatus having transmitted the data, the channel estimation value, the multi-access signature resource used by the identified terminal apparatus, and the like. Note that the function of the controller 108 can be included in the higher layer processing unit 102.

The transmitter 104 codes and modulates the broadcast information, the downlink control information, the downlink shared channel, and the like input from the higher layer processing unit 102 for each terminal apparatus, to generate a physical broadcast channel, a physical downlink control channel, and a physical downlink shared channel. The coding unit 1040 codes the broadcast information, the downlink control information, and the downlink shared channel by using the predetermined coding scheme/coding scheme determined by the higher layer processing unit 102 (the coding includes repetitions). The coding scheme may involve application of convolutional coding, turbo coding, Low Density Parity Check (LDPC) coding, Polar coding, and the like. The modulation unit 1042 modulates the coded bits input from the coding unit 1040, in compliance with the predetermined modulation scheme/modulation scheme determined by the higher layer processing unit 102, such as BPSK, QPSK, 16QAM, 64QAM, or 256QAM.

The downlink control signal generation unit 1046 adds the CRC to the downlink control information input from the controller 108, to generate a physical downlink control channel. The downlink control information includes a portion or all of the configuration information related to the grant free access. The CRC is scrambled with the UE ID allocated to each terminal apparatus. The downlink reference signal generation unit 1048 generates a downlink reference signal. The downlink reference signal is determined in accordance with a predetermined rule based on, e.g., the UE ID for identifying the base station apparatus 10.

The multiplexing unit 1044 maps the modulation symbols of each modulated downlink physical channel, the physical downlink control channel, and the downlink reference signal to the resource elements. The multiplexing unit 1044 maps the physical downlink shared channel and the physical downlink control channel to resources allocated to each terminal apparatus.

The IFFT unit 1049 performs Inverse Fast Fourier Transform (IFFT) on the modulation symbols of each multiplexed downlink physical channel to generate OFDM symbols. The radio transmitting unit 1050 adds cyclic prefixes (CPs) to the OFDM symbols to generate a baseband digital signal. Furthermore, the radio transmitting unit 1050 converts the digital signal into an analog signal, removes excess frequency components from the analog signal by filtering, performs up-conversion to the carrier frequency, performs power amplification, and outputs the resultant signal to the transmit antenna 106 for transmission.

The receiver 112 uses the demodulation reference signal/identification signal to detect the uplink physical channel transmitted from the terminal apparatus 20 by the grant free access. The receiver 112 identifies the terminal apparatus for each terminal apparatus and detects the uplink physical channel, based on the configuration information related to the grant free access configured for each terminal apparatus.

The radio receiving unit 1120 converts, by down-conversion, an uplink signal received through the receive antenna 110 into a baseband signal, removes unnecessary frequency components from the baseband signal, controls the amplification level in such a manner as to suitably maintain a signal level, performs orthogonal demodulation based on an in-phase component and an orthogonal component of the received signal, and converts the resulting orthogonally-demodulated analog signal into a digital signal. The radio receiving unit 1120 removes a portion of the digital signal resulting from the conversion, the portions corresponding to the CPs. The FFT unit 1121 performs Fast Fourier Transform (FFT) on the signal from which the CPs have been removed, and extracts a signal in the frequency domain.

The channel estimation unit 1122 uses the demodulation reference signal/identification signal to perform identification of the terminal apparatus and channel estimation for signal detection for the uplink physical channel. The channel estimation unit 1122 receives as inputs, from the controller 108, the resources to which the demodulation reference signal/identification signal are mapped and the demodulation reference signal sequence/identification signal allocated to each terminal apparatus. The channel estimation unit 1122 uses the demodulation reference signal sequence/identification signal to measure the channel state between the base station apparatus 10 and the terminal apparatus 20. The channel estimation unit 1122 can identify the terminal apparatus by using the result of channel estimation (impulse response and frequency response with the channel state) (the channel estimation unit 1122 is thus also referred to as an identification unit). The channel estimation unit 1122 determines that an uplink physical channel has been transmitted by the terminal apparatus 20 associated with the demodulation reference signal/identification signal from which the channel state has been successfully extracted. In the resource on which the uplink physical channel is determined by the channel estimation unit 1122 to have been transmitted, the demultiplexing unit 1124 extracts the signal in the frequency domain input from the radio receiving unit 1120 (the signal includes signals from multiple terminal apparatuses 20).

The signal detection unit 1126 uses the channel estimation result and the signal in the frequency domain input from the demultiplexing unit 1124 to detect a signal of uplink data (uplink physical channel) from each terminal apparatus. The signal detection unit 1126 performs detection processing for a signal from the terminal apparatus 20 associated with the demodulation reference signal (demodulation reference signal from which the channel state has been successfully extracted)/identification signal allocated to the terminal apparatus 20 determined to have transmitted the uplink data.

The higher layer processing unit 102 acquires, from the signal detection unit 1126, decoded uplink data (bit sequence resulting from hard decision) for each terminal apparatus. The higher layer processing unit 102 performs descrambling (exclusive-OR operation) on the CRC included in the decoded uplink data for each terminal apparatus, by using the UE ID allocated to the terminal. In a case that no error is found in the uplink data as a result of the descrambling error detection, the higher layer processing unit 102 correctly completes the identification of the terminal apparatus and determines that the uplink data transmitted from the terminal apparatus has been correctly received.

Figure 9:
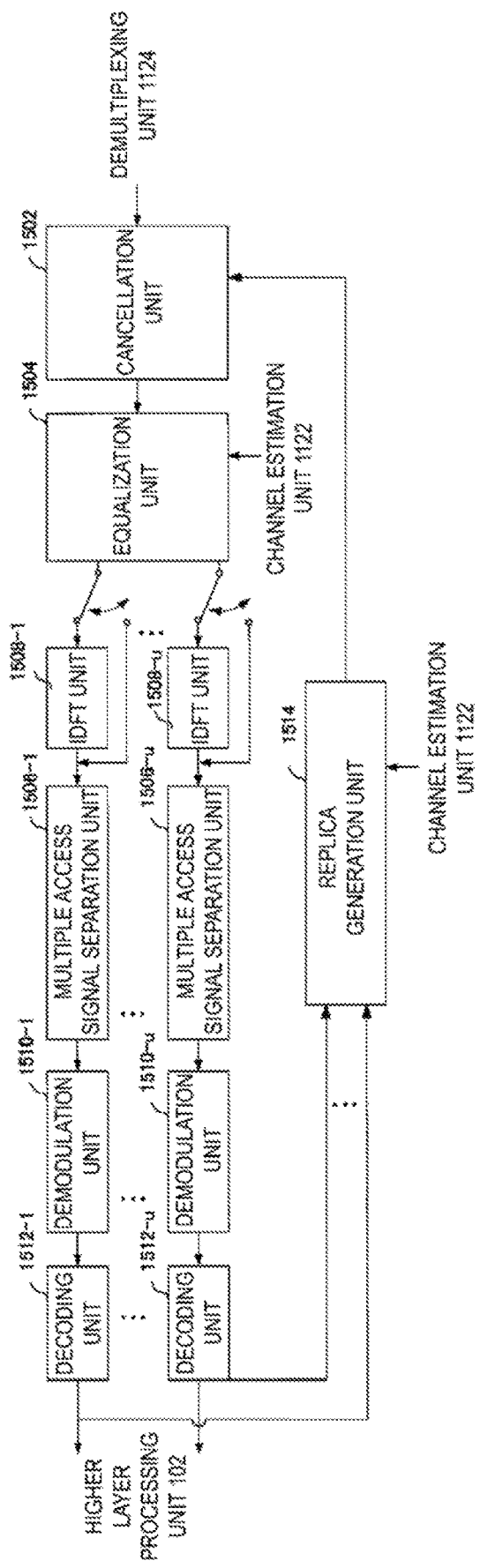
FIG. 9 is a diagram illustrating an example of a signal detecting unit according to the first embodiment.

FIG. 9 is a diagram illustrating an example of the signal detection unit according to the present embodiment. The signal detection unit 1126 includes a cancellation unit 1502, an equalization unit 1504, multiple access signal separation units 1506-1 to 1506-$u$, IDFT units 1508-1 to 1508-$u$, demodulation units 1510-1 to 1510-$u$, decoding units 1512-1 to 1512-$u$, and a replica generation unit 1514. u is the number of terminal apparatuses determined by the channel estimation unit 1122 to have transmitted uplink data (for which the channel state has been successfully extracted) on the same multi-access physical resource or overlapping multi-access physical resources (at the same time and at the same frequency). Each of the portions constituting the signal detection unit 1126 is controlled using the configuration related to the grant free access for each terminal apparatus and input from the controller 108.

The cancellation processing unit 1501 subtracts a soft replica input from the replica generation unit 1514 from the signal in the frequency domain input from the demultiplexing unit 1124 (the signal includes the signals from the terminal apparatuses) (cancellation processing). The equalization unit 1504 generates an equalization weight based on the MMSE standard, from the frequency response input from the channel estimation unit 1122. Here, MRC and ZF may be used for the equalization processing. The equalization unit 1504 multiplies the equalization weight by the signal in the frequency domain resulting from soft cancellation, and extracts the signal in the frequency domain from each terminal apparatus. The equalization unit 1504 outputs the equalized signal in the frequency domain from each terminal apparatus to the IDFT units 1508-1 to 1508-$u$. Here, in a case that data is to be detected that is transmitted by the terminal apparatus 20 and that uses the DFTS-OFDM signal waveform, the signal in the frequency domain is output to the IDFT units 1508-1 to 1508-$u$. In a case that data is to be received that is transmitted by the terminal apparatus 20 and that uses the OFDM signal waveform, the signal in the frequency domain is output to the multiple access signal separation units 1506-1 to 1506-$u$.

The IDFT units 1508-1 to 1508-$u$ converts the equalized signal in the frequency domain from each terminal apparatus into a signal in the time domain. Note that the IDFT units 1508-1 to 1508-$u$ correspond to processing performed by the DFT unit 2104 of the terminal apparatus 20. The multiple access signal separation units 1506-1 to 1506-$u$ separates the signal multiplexed by the multi-access signature resource from the signal in the time domain from each terminal apparatus after conversion with the IDFT (multiple access signal separation processing). For example, in a case that code spreading is used as a multi-access signature resource, each of the multiple access signal separation units 1506-1 to 1506-$u$ performs inverse spreading processing using the spreading code sequence assigned to each terminal apparatus. Note that, in a case that interleaving is applied as a multi-access signature resource, de-interleaving is performed on the signal in the time domain from each terminal apparatus after conversion with the IDFT (deinterleaving unit).

The demodulation units 1510-1 to 1510-$u$ receive as an input, from the controller 108, pre-notified or predetermined information about the modulation scheme of each terminal apparatus. Based on the information about the modulation scheme, the demodulation units 1510-1 to 1510-$u$ perform demodulation processing on the separated multiple access signal, and outputs a Log Likelihood Ratio (LLR) of the bit sequence.

The decoding units 1512-1 to 1512-$u$ receives as an input, from the controller 108, pre-notified or predetermined information about the coding rate. The decoding units 1512-1 to 1512-$u$ perform decoding processing on the LLR sequences output from the demodulation units 1510-1 to 1510-$u$. In order to perform cancellation processing such as a Successive Interference Canceller (SIC) or turbo equalization, the decoding units 1512-1 to 1512-$u$ output, to the replica generator 1514, external LLRs or post LLRs output from the decoding units. A difference between the external LLR and the post LLR is whether to subtract, from the decoded LLR, the pre LLR input to each of the decoding units 1512-1 to 1512-$u$. In a case that the number of repetitions of SIC or turbo equalization is larger than or equal to a prescribed value, the decoding units 1512-1 to 1512-$u$ perform hard decision on the LLR resulting from the decoding processing, and outputs the bit sequence of the uplink data for each terminal apparatus to the higher layer processing unit 102.

The replica generation unit 1514 generate a symbol replica for each terminal apparatus in accordance with the modulation scheme in which the LLR sequence input from each decoding unit is applied to the uplink data by the terminal apparatus. The replica generation unit 1514 performs signal conversion on the symbol replica according to the multi-access signature resource applied to the uplink data by each terminal apparatus. Furthermore, the replica generation unit 1514 converts, by the DFT, the signal resulting from the multiple access processing to a signal in the frequency domain. Then, the replica generation unit 1514 multiplies the signal resulting from the DFT by the frequency response input from the channel estimation unit 1122, to generate a soft replica. Note that, in FIG. 9, the signal detection using the turbo equalization processing has been described but can be replaced with signal detection based on replica generation and using no interference cancellation, maximum likelihood detection, EMMSE-IRC, or the like.

Figure 10:
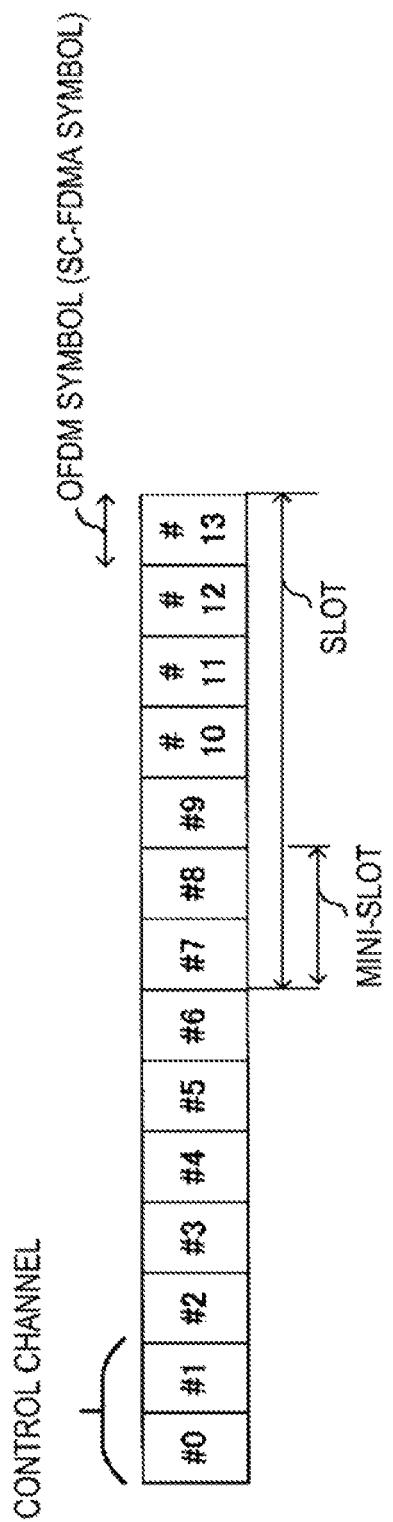
FIG. 10 is a diagram illustrating an example of a downlink radio frame configuration according to the first embodiment.

FIG. 10 is a diagram illustrating an example of a downlink frame configuration according to the first embodiment. FIG. 10 illustrates a case where one subframe includes 14 OFDM symbols, one slot includes 7 OFDM symbols, and one mini-slot includes one or more and seven or less OFDM symbols (in FIG. 10, two OFDM symbols). In the downlink, the physical downlink control channel is mapped to a prescribed number of OFDM symbols starting with the leading symbol, and the notification such as UL Grant or DL Grant for the scheduled access (notification of downlink data transmission), and notification of D-GFA resources for the grant free access is provided. However, a specific frequency resource such as EPDCCH may be configured as a control channel and the control information described above may be transmitted on this control channel.

The base station apparatus 10 does not notify the terminal apparatus 20 which resource in the physical downlink control channel is used to transmit control information, the terminal apparatus 20 attempts to detect the control information by blind decoding a search space corresponding to candidates to which the control information is mapped. The search space includes a search space common to the terminal apparatuses 20 within the cell (Common Search Space (CSS)) and a search space specific to the terminal apparatus 20 (UE-specific SS (USS)).

The base station apparatus 10 notifies the terminal apparatus 20 of the position of the USS, the result of the blind decoding, and the C-RNTI, which is the UE ID and enables the detection only of the control information addressed to the base station apparatus itself. The terminal apparatus 20 uses the C-RNTI to calculate a start position of the USS. Furthermore, the terminal apparatus 20 uses a bit sequence resulting from an exclusive-OR operation on the result of blind decoding of the search space and the CRC and C-RNTI added to the control information, to check the bit sequence for any error. This is because the base station apparatus 10 masks (exclusive-OR operation) the CRC with the C-RNTI of the destination terminal apparatus to prevent the control information addressed to the other terminal apparatuses from being detected.

The base station apparatus 10 may notify the terminal apparatuses 20 capable of using D-GFA resources of a GFA-RNTI as an ID for detecting control information used for notification of the D-GFA resources. The GFA-RNTI may be exclusively used for exclusive-OR operation on the CRC. In other words, the start position of the USS may be calculated using the C-RNTI as in the related art instead of using the GFA-RNTI. The GFA-RNTI may be allocated to multiple terminal apparatuses 20 rather than specifically to one terminal apparatus 20. In this case, the D-GFA resource is shared by the terminal apparatuses 20 to which the GFA-RNTI is allocated. Here, in the mMTC transmission mode, low power consumption is generally required, and thus blind decoding for detecting the control information about D-GFA resources is not preferable. Thus, the base station apparatus 10 may configure the GFA-RNTI only for the terminal apparatus 20 in URLLC transmission mode.

In a case that SS-GFA resources and D-GFA resources are available for data transmission, the terminal apparatuses 10 capable of using the D-GFA resources may preferentially use at least one D-GFA resource. This enables avoidance of a collision with a data signal from the terminal apparatus 10 capable of using only the SS-GFA resources, contributing to improving reliability of the data transmission.

The base station apparatus 10 may transmit control information for notification of D-GFA resources on a specific physical downlink control channel, e.g., one or a combination of PDCCH, EPDCCH, MPDCCH, and NPDCCH. In this case, the terminal apparatus 20 may blind-decode only the specific physical downlink control channel to detect the control information about the D-GFA resource. The base station apparatus 10 may map the control information for notification of D-GFA resources only to a specific search space, e.g., the CSS. In this case, the terminal apparatus 20 may blind-decode only the specific search space in order to detect the control information about the D-GFA resource. An aspect of the present invention does not limit, to the physical channel or the search space, the resource to which the control information for notification of D-GFA resources is mapped, and may limit the resource at an aggregation level.

In a case that the D-GFA resources are non-contiguous as in FIG. 7, one codeword may be allocated to one contiguous D-GFA resource. In a case that non-contiguous D-GFA resources are simultaneously used, multiple codewords may be transmitted. The unit of frequency to which one codeword is allocated may be a resource block or a resource block group. In a case that multiple codewords are transmitted simultaneously, the OFDM signal waveform may be used for transmission.

The terminal apparatus 10 capable of using the D-GFA resources need not monitor the control information for notification of D-GFA resources in a case that data transmitted on the D-GFA resource (for example, data in the URLLC transmission mode) is not present in a buffer. Here, the data not being present in the buffer may correspond to any of data to be transmitted by the terminal apparatus 20, transmitted data for which no ACK has been received on the PHICH or the like from the base station apparatus 10, and data for which allocation for initial transmission has not been received by a New Data Indicator (NDI) in the DCI from the base station apparatus 10. The terminal apparatuses 10 capable of using the D-GFA resources do not perform blind decoding during the time when Discontinuous reception (DRX) is configured. However, in a case that data for which low delay is required (data in the URLLC transmission mode) is stored in the buffer, the terminal apparatus 10 may blind-decode only the control information for notification of D-GFA resources and need not blind-decode the control information about the DL Grant or the UL Grant control.

In the present embodiment, the base station apparatus 10 transmits control information for notification of D-GFA resources and directed at multiple terminal apparatuses 20 and control information about the UL Grant specific to the terminal apparatus 20. Furthermore, the base station apparatus 10 transmits SS-GFA resources as control information directed at multiple terminal apparatuses 20 or control information specific to the terminal apparatus 20. In this manner, the terminal apparatus 20 can use the D-GFA resources and the SS-GFA resources in a case of performing data transmission in the grant free access, enabling a reduction in collision probability. The base station apparatus 10 is unable to control the timing to perform data transmission in the grant free access. However, enabling the D-GFA resources to be configured allows the SS-GFA resources to be minimized. This allows frequency utilization efficiency to be improved.

Second Embodiment

The present embodiment is an example of a method for transmitting, in the grant free access, control information in which the base station apparatus 10 notifies D-GFA resources. The communication system according to the present embodiment includes the base station apparatus 10 and the terminal apparatus 20 illustrated with reference to FIG. 3, FIG. 8, and FIG. 9. Differences from/additions to the first embodiment will be mainly described below.

Figure 11:
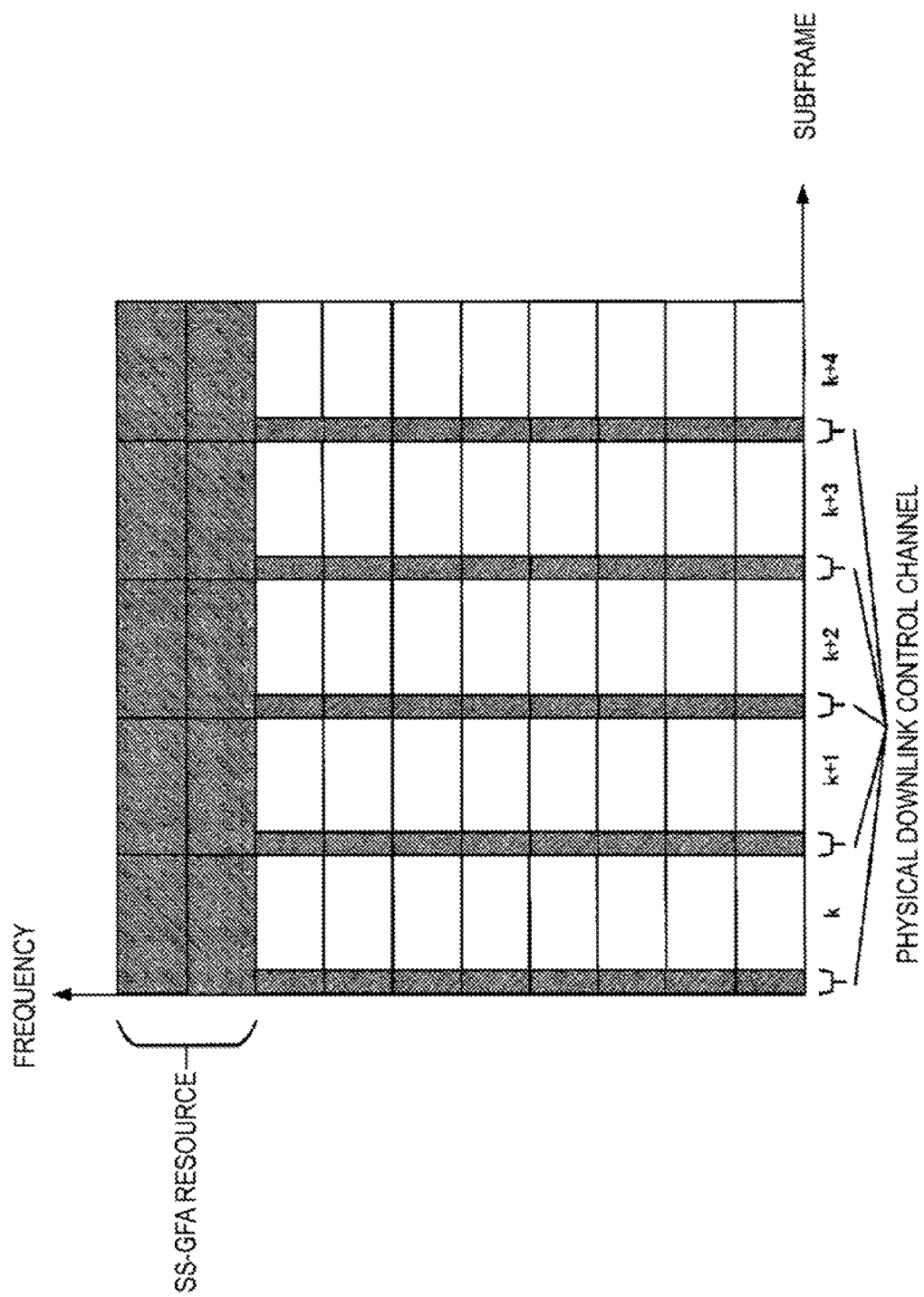
FIG. 11 is a diagram illustrating an example of a frame configuration according to a second embodiment.

FIG. 11 illustrates an example of a frame configuration according to the second embodiment. In FIG. 11, the vertical axis indicates frequency, the horizontal axis indicates subframe (time). Hatched portions (left downward sloping lines) correspond to the SS-GFA resources and hatched portions (right downward sloping lines) correspond to the physical downlink control channel. In the present embodiment, the description is given of a case where D-GFA resources are notified on the physical downlink control channel. In the example in FIG. 11, the physical downlink control channel is mapped to each subframe. However, the physical downlink control channel may be mapped to each slot, and in that case, the horizontal axis in FIG. 11 indicates slots. The present embodiment may be applied to Time Division Duplex (TDD or frame structure type 2) or to Frequency Division Duplex (FDD or frame structure type 1) or to frame structure type 3 for an unlicensed band. The present embodiment may be applied to self-contained subframes including a downlink section and an uplink section within one subframe.

The base station apparatus 10 transmits control information for notification of D-GFA resources (hereinafter referred to as D-GFA allocation information) on the physical downlink control channel of FIG. 11. The D-GFA allocation information may include information about frequency resources and the relative number of subframes (time information; s2-s1) corresponding to the relative number of subframes between a subframe number s1 at which the D-GFA allocation information is transmitted and a subframe number s2 at which the D-GFA resources are configured. For example, in a case that the D-GFA allocation information is transmitted in subframe k in FIG. 11 and the D-GFA resources are configured in subframe k+3, the D-GFA allocation information may include information indicating the relative number of subframes of 3. In a case of FDD, the D-GFA allocation information is transmitted in a downlink serving cell, and in an uplink serving cell associated with the downlink serving cell, D-GFA resources are notified in time and frequency information included in the D-GFA allocation information. Note that, as described in the first embodiment, only the time information may be included in the D-GFA allocation information. In a case of TDD, the relative number of subframes (time information) included in the D-GFA allocation information may be calculated using only the uplink subframes, or s2-s1-sd (s1, s2) may be calculated. However, sd (s1, s2) is the number of downlink subframes between the subframe number s1 and the subframe number s2. Specifically, in a case that the D-GFA allocation information is transmitted in subframe k in FIG. 11 and the D-GFA resources are configured in subframe k+3, the relative number of subframes may be 2 in a case that subframes k and k+1 are downlink subframes and subframes k+2 and k+3 are uplink subframes. In a case of self-contained subframes, the relative number of subframes included in the D-GFA allocation information can be 0, and the D-GFA allocation information and the D-GFA resources can be on different slots/mini-slots/OFDM symbols within the same subframe.

The D-GFA resources need not be in subframe units, and in addition to the information about the relative number of subframes, the D-GFA allocation information may include information about the slots in the subframe (only the first half slots, only the latter half slots, or all of the slots), information about mini-slots (specifying the positions of mini-slots within the subframe, the mini-slots being used as D-GFA resources), or information about OFDM symbols (specifying the positions of OFDM symbols within the subframe, the OFDM symbols being used as D-GFA resources).

The base station apparatus 10 may include, in the D-GFA allocation information, information about D-GFA resources in multiple subframes. The specific frequency resources may be D-GFA resources in multiple subframes, and in this case, the D-GFA allocation information may include the number of subframes effective as D-GFA resources (effective period). In the D-GFA allocation information, different frequency resources may be allocated for each subframe as D-GFA resources, and the base station apparatus 10 may notify the positions, within each subframe, of frequencies of D-GFA resources, as one piece of control information.

In the URLLC transmission mode, the terminal apparatus 20 fails to recognize the D-GFA resources in a case that the D-GFA allocation information is notified in a subframe not blind-decoded by the DRX or the like of the above embodiment. Thus, the base station apparatus 10 may transmit the D-GFA allocation information multiple times using different subframes/slots/mini-slots/OFDM symbols. In this case, instead of repeatedly transmitting the same control information, the base station apparatus 10 changes the relative number of subframes included in the D-GFA allocation information according to the transmission subframe number, and transmits one piece of D-GFA allocation information multiple times. Since one piece of D-GFA allocation information is transmitted multiple times, the terminal apparatus 20 may stop the blind decoding in a case of detecting the D-GFA allocation information by the blind decoding. The terminal apparatus 20 may determine whether to continue the blind decoding or not depending on the size of data remaining in the buffer, and may stop the blind decoding in a case that the amount of data remaining in the buffer is less than or equal to a prescribed value.

The base station apparatus 10 may configure, in the D-GFA allocation information, multiple D-GFA resources within one subframe/slot/mini-slot/OFDM symbol, and the multiple D-GFA resources may be non-contiguous (discrete) frequency resources or contiguous frequency resources. In this case, the base station apparatus 10 may classify the terminal apparatuses 20 capable of using the D-GFA resources into multiple groups, and may allocate different GFA-RNTIs in units of groups. Furthermore, the base station apparatus 10 may notify the D-GFA allocation information in units of groups, and include only some of the multiple D-GFA resources in the D-GFA allocation information notified to each group. Thus, the base station apparatus 10 can allocate different D-GFA resources to respective groups.

In the present embodiment, the base station apparatus 10 notifies at least some of the positions of the subframes/slots/mini-slots/OFDM symbols, the effective periods, the frequency resources, and the like as D-GFA allocation information. Furthermore, the base station apparatus 10 transmits the D-GFA allocation information about one D-GFA resource multiple times. Furthermore, the base station apparatus 10 groups the terminal apparatuses 20 in the URLLC transmission mode, and notifies each group of the D-GFA allocation information. In this manner, by notifying the D-GFA allocation information, the terminal apparatus 20 can efficiently perform data transmission requiring low delay/high reliability. Furthermore, the terminal apparatus 20 can use the D-GFA resources and the SS-GFA resources in a case of performing data transmission in the grant free access, enabling a reduction in collision probability. The base station apparatus 10 is unable to control the timing to perform data transmission in the grant free access. However, enabling the D-GFA resources to be configured allows the SS-GFA resources to be minimized. This allows frequency utilization efficiency to be improved.

Third Embodiment

The present embodiment is an example of control information in which the base station apparatus 10 notifies SS-GFA resources in the grant free access. The communication system according to the present embodiment includes the base station apparatus 10 and the terminal apparatus 20 illustrated with reference to FIG. 3, FIG. 8, and FIG. 9. Differences from/additions to the first embodiment will be mainly described below.

Figure 12:
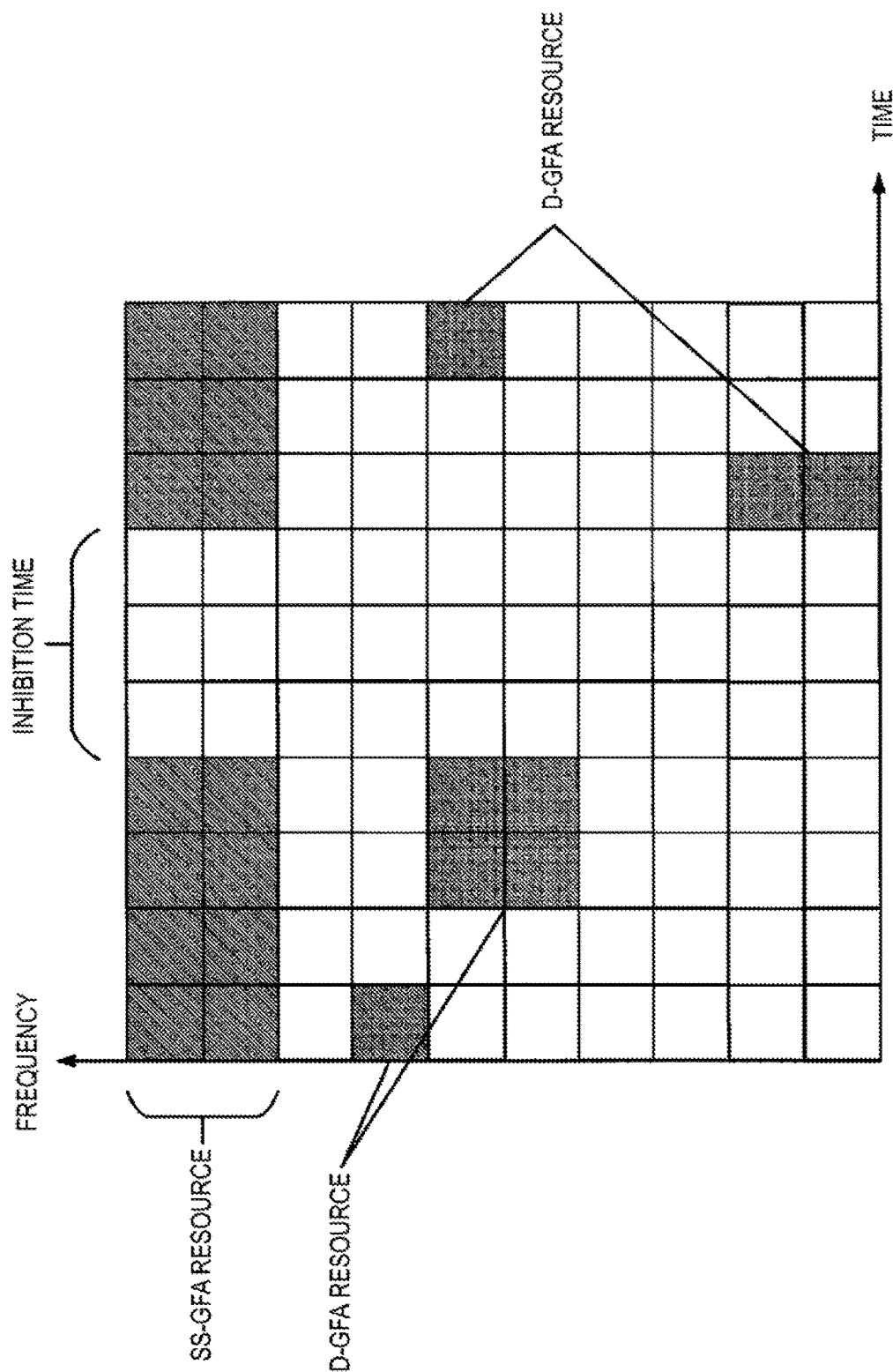
FIG. 12 is a diagram illustrating an example of a frame configuration according to a third embodiment.

FIG. 12 illustrates an example of a frame configuration according to a third embodiment. In FIG. 12, the vertical axis indicates frequency, and the horizontal axis indicates time. Hatched portions (left downward sloping lines) indicate the SS-GFA resources, and shaded portions indicate the D-GFA resources. The remaining portions indicate resources for which data transmission in the grant free access is not allowed. The base station apparatus 10 uses the control information about the physical downlink broadcast channel, the RRC message, the SIB, and the like to notify the terminal apparatus of SS-GFA resources in the URLLC transmission mode or the mMTC transmission mode. The control information for notification of SS-GFA resources may include information about subframes/slots/mini-slots/OFDM symbols (frame configuration) for which the grant free access is not allowed. The control information for notification of SS-GFA resources may include frequency resources for which the grant free access is not allowed. The control information for notification of SS-GFA resource may include information of a subframe/slot/mini-slot/OFDM symbol in which the use of the SS-GFA resource is not allowed. The frame configuration included in the control information for notification of SS-GFA resources may include information about a cycle at which the subframes/slots/mini-slots/OFDM symbols for which the grant free access is not allowed are configured. This allows configuration of subframes/slots/mini-slots/OFDM symbols for which the grant-free access is periodically is not allowed, and enables a reduction in the frequency of transmission of the control information.

In a case that the control information for notification of SS-GFA resources includes information about the subframes/slots/mini-slots/OFDM symbols for which the use of the SS-GFA resources is not allowed and that the terminal apparatus 20 needs to transmit data on the subframes/slots/mini-slots/OFDM symbols, the terminal apparatus 20 may blind-decode the control information for notification of D-GFA resources, and in a case of detecting the D-GFA resource control information, perform the grant free access on the D-GFA resource.

In a case that the control information for notification of SS-GFA resources includes information (frame configuration) about the subframes/slots/mini-slots/OFDM symbols for which the use of the SS-GFA resources is not allowed, the terminal apparatus 20 may prioritize the frame configuration over the other control information. For example, in the subframes/slots/mini-slots/OFDM symbols specified in the frame configuration, the terminal apparatus 20 may be configured not to transmit data even at a transmission timing based on Semi-Persistent Scheduling (SPS) or at a schedule based transmission timing following reception of the UL Grant. In the subframes/slots/mini-slots/OFDM symbols specified in the frame configuration, even at a transmission timing for the physical uplink control channel (ACK/NACK or Channel State Information (CSI)) or a Sounding Reference Signal (SRS), the terminal apparatus 20 may be configured not to transmit these signals. The base station apparatus 10 may notify the terminal apparatus 20, as the control information, which of the following is prioritized: transmission of the frame configuration information and other data, transmission of the control information, and transmission of the SRS.

In the present embodiment, the base station apparatus 10 notifies, along with the control information for notification of SS-GFA resources, information about the subframes/slots/mini-slots/OFDM symbols for which the grant free access is not allowed. Thus, the SS-GFA resources are not always dedicated frequency resources for the grant free access, and can be used for the scheduled access or other data transmission. As a result, the frequency resources can be flexibly used, and frequency utilization efficiency is expected to be improved.

Note that multiple embodiments may be applied in combination, or only each of the embodiments may be applied, as the embodiments herein.

A program running on an apparatus according to an aspect of the present invention may serve as a program that controls a Central Processing Unit (CPU) and the like to cause a computer to operate in such a manner as to realize the functions of the above-described embodiments according to the present invention. Programs or the information handled by the programs are temporarily read into a volatile memory, such as a Random Access Memory (RAM) while being processed, or stored in a non-volatile memory, such as a flash memory, or a Hard Disk Drive (HDD), and then read by the CPU to be modified or rewritten, as necessary.

Note that the apparatuses in the above-described embodiments may be partially enabled by a computer. In that case, a program for realizing the functions of the embodiments may be recorded on a computer readable recording medium. The program recorded on the recording medium may be implemented by being loaded into and performed by a computer system. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, and the like.

Moreover, the "computer-readable recording medium" may include a medium that dynamically retains a program for a short period of time, such as a communication line that is used for transmission of the program over a network such as the Internet or over a communication line such as a telephone line, and may also include a medium that retains a program for a fixed period of time, such as a volatile memory within the computer system for functioning as a server or a client in such a case. Furthermore, the program may be configured to realize some of the functions described above, and also may be configured to be capable of realizing the functions described above in combination with a program already recorded in the computer system.

Furthermore, each functional block or various characteristics of the apparatuses used in the above-described embodiments may be implemented or performed on an electric circuit, that is, typically an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor, or may be a processor of a known type, a controller, a micro-controller, or a state machine. The above-described electric circuit may include a digital circuit or may include an analog circuit. Furthermore, in a case that with advances in semiconductor technology, a circuit integration technology appears that replaces the present integrated circuits, it is also possible to use an integrated circuit based on the technology.

Note that the invention of the present patent application is not limited to the above-described embodiments. In the embodiments, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications can be made to the aspect of the present invention within the scope of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

An aspect of the present invention can be suitably used in a base station apparatus, a terminal apparatus, and a communication method. An aspect of the present invention can be utilized, for example, in a communication system, communication equipment (for example, a cellular phone apparatus, a base station apparatus, a radio LAN apparatus, or a sensor device), an integrated circuit (for example, a communication chip), or a program.

REFERENCE SIGNS LIST

10, 12, 14 Base station apparatus
20-1 to 20-$n$1, 22-1 to 22-$n$2, 24-1 to 24-$n$3 Terminal apparatus
10$a$ Area within which base station apparatus 10 is connectable to terminal apparatus
12$a$ Area within which base station apparatus 12 is connectable to terminal apparatus
14$a$ Area within which base station apparatus 14 is connectable to terminal apparatus
102 Higher layer processing unit
104 Transmitter
106 Transmit antenna
108 Controller
110 Receive antenna
112 Receiver
1040 Coding unit
1042 Modulation unit
1044 Multiplexing unit
1046 Downlink control signal generation unit
1048 Downlink reference signal generation unit
1049 IFFT unit
1050 Radio transmitting unit
1120 Radio receiving unit
1121 FFT unit
1122 Channel estimation unit
1124 Demultiplexing unit
1126 Signal detection unit
1502 Canceling unit
1504 Equalization unit
1506-1 to 1506-$u$ Multiple access signal separation unit
1508-1 to 1508-$u$ IDFT unit
1510-1 to 1510-$u$ Demodulation unit
1512-1 to 1512-$u$ Decoding unit
1514 Replica generation unit
202 Receive antenna 204 Receiver
206 Higher layer processing unit
208 Controller
210 Transmitter
212 Transmit antenna
2100 Coding unit
2102 Modulation unit
2104 DFT unit
2106 Multiple access processing unit
2108 Multiplexing unit
2109 IFFT unit
2110 Radio transmitting unit
2112 Uplink reference signal generation unit
2040 Radio receiving unit
2041 FFT unit
2042 Demultiplexing unit
2044 Demodulation unit
2046 Decoding unit

The invention claimed is:

1. A base station apparatus for communicating with a terminal apparatus, the base station apparatus comprising:
 a controller configured to generate first control information specific to the terminal apparatus and second control information addressed to multiple terminal apparatuses, and
 a receiver including multiple uplink multi-access resources, and configured to receive an uplink physical channel, wherein:
 the receiver receives data which the terminal apparatus transmits without receiving, in the first control information, control information for uplink grant;
 the first control information indicates semi-static allocation of a radio resource used for transmission of the data;
 the second control information indicates dynamic allocation of the radio resource used for transmission of the data; and
 in a case that the second control information having been detected includes information for indicating non-contiguous frequency resources, a frequency resource used for data transmission is selected by the terminal apparatus without reception of the control information for the uplink grant.

2. The base station apparatus according to claim 1, wherein an ID for detecting the first control information differs from an ID for detecting the second control information.

3. The base station apparatus according to claim 1, wherein the controller generates control information for indicating at least one of a physical channel used for transmission of the second control information or a candidate search space to which the second control information is to be mapped.

4. The base station apparatus according to claim 1, wherein information of the radio resource included in the second control information includes the relative number of subframes from the subframe in which the second control information has been transmitted to a starting subframe, and the number of effective subframes.

5. The base station apparatus according to claim 1, wherein the first control information includes either a subframe number or a period information for inhibiting the terminal apparatus from transmitting data without receiving the control information for the uplink grant.

6. A terminal apparatus for communicating with a base station apparatus, the terminal apparatus comprising:
 a receiver, and configured to receive, from the base station apparatus, first control information specific to the terminal apparatus and second control information addressed to multiple terminal apparatuses; and
 a transmitter including multiple uplink multi-access resources configured to perform uplink data transmission, based on the first control information or the second control information, wherein:
 the transmitter transmits data without receiving, in the first control information, control information for uplink grant;
 the first control information is information for semi-static allocation of a radio resource used for the data transmission;
 the second control information is information for dynamic allocation of the radio resource used for the data transmission; and
 in a case that the second control information having been detected includes information for indicating non-contiguous frequency resources, a frequency resource used for data transmission is selected without reception of the control information for the uplink grant.

7. The terminal apparatus according to claim 6, wherein the transmitter performs the uplink data transmission, based on the first control information in a case of having failed to detect the second control information.

8. The terminal apparatus according to claim 6, further comprising
 a controller configured to generate control information for requesting the uplink grant, wherein
 in a case that the second control information fails to be detected, the control information for requesting the uplink grant is transmitted.

9. The terminal apparatus according to claim 6, wherein in a case that the receiver receives an ID for receiving the second control information, reception processing for the second control information is performed only in a case that data to be transmitted by the transmitter is present in a buffer.

10. The terminal apparatus according to claim 6, wherein the first control information includes a subframe number and a period information for inhibiting the terminal apparatus from transmitting data without receiving the control information for the uplink grant.

* * * * *